United States Patent
Ghim et al.

(10) Patent No.: US 10,466,031 B2
(45) Date of Patent: Nov. 5, 2019

(54) APPARATUS FOR MEASURING THICKNESS AND SURFACE PROFILE OF MULTILAYERED FILM STRUCTURE USING IMAGING SPECTRAL OPTICAL SYSTEM AND MEASURING METHOD

(71) Applicant: KOREA RESEARCH INSTITUTE OF STANDARDS AND SCIENCE, Daejeon (KR)

(72) Inventors: Young-Sik Ghim, Sejong (KR); Hyug-Gyo Rhee, Daejeon (KR); Yun Woo Lee, Daejeon (KR)

(73) Assignee: KOREA RESEARCH INSTITUTE OF STANDARDS AND SCIENCE, Daejeon (KR)

( * ) Notice: Subject to any disclaimer, the term of this patent is extended or adjusted under 35 U.S.C. 154(b) by 0 days.

(21) Appl. No.: 15/538,846

(22) PCT Filed: Aug. 26, 2016

(86) PCT No.: PCT/KR2016/009500
§ 371 (c)(1),
(2) Date: Jun. 22, 2017

(87) PCT Pub. No.: WO2017/217590
PCT Pub. Date: Dec. 21, 2017

(65) Prior Publication Data
US 2019/0101373 A1    Apr. 4, 2019

(30) Foreign Application Priority Data
Jun. 16, 2016  (KR) .................. 10-2016-0075238

(51) Int. Cl.
G01B 9/02 (2006.01)
G01B 11/06 (2006.01)
(Continued)

(52) U.S. Cl.
CPC ..... *G01B 9/02041* (2013.01); *G01B 9/02015* (2013.01); *G01B 9/02062* (2013.01);
(Continued)

(58) Field of Classification Search
CPC ............ G01B 9/02041; G01B 9/02015; G01B 9/02062; G01B 11/0675; G06F 17/16; G06F 17/17
See application file for complete search history.

(56) References Cited

U.S. PATENT DOCUMENTS 5,042,949 A * 8/1991 Greenberg ......... G01B 11/0608
356/451
5,129,724 A * 7/1992 Brophy .............. G01B 11/0608
356/503
(Continued)

FOREIGN PATENT DOCUMENTS

JP    2001311609 A * 11/2001
JP    2001356050 A * 12/2001
(Continued)

OTHER PUBLICATIONS

Ghim, Young-Sik, and Seung-Woo Kim. "Fast, precise, tomographic measurements of thin films." Applied Physics Letters 91.9 (2007): 091903. (Year: 2007).*
(Continued)

*Primary Examiner* — Dominic J Bologna
(74) *Attorney, Agent, or Firm* — Allen, Dyer, Doppelt + Gilchrist, P.A.

(57) ABSTRACT

The present disclosure relates to an apparatus for measuring a thickness and a surface profile of a multilayered film structure using an imaging spectral optical system and a measuring method. More specifically, the present disclosure relates to a method and an apparatus which measure a thickness and a surface profile of a multilayered thin film
(Continued)

structure by applying a method for obtaining an absolute reflectance value for an object to be measured having a multilayered thin film using a reflected light measuring method and extracting a phase from an interference signal with a reference mirror using a phase shift algorithm.

15 Claims, 24 Drawing Sheets

(51) Int. Cl.
  *G06F 17/16* (2006.01)
  *G06F 17/17* (2006.01)
  *G01B 11/24* (2006.01)

(52) U.S. Cl.
  CPC ...... *G01B 11/0625* (2013.01); *G01B 11/0675* (2013.01); *G01B 11/2441* (2013.01); *G06F 17/16* (2013.01); *G06F 17/17* (2013.01)

(56) References Cited

U.S. PATENT DOCUMENTS

| | | | | |
|---|---|---|---|---|
| 5,555,471 | A * | 9/1996 | Xu | G01B 11/0675 356/504 |
| 7,483,147 | B2 * | 1/2009 | Kim | G01B 11/0675 356/495 |
| 2004/0085544 | A1 * | 5/2004 | De Groot | G01B 11/0675 356/497 |
| 2005/0073692 | A1 * | 4/2005 | De Groot | G01B 11/0675 356/497 |
| 2005/0088663 | A1 * | 4/2005 | De Groot | G01B 11/0675 356/497 |
| 2017/0314914 | A1 * | 11/2017 | Chalmers | G01B 11/2441 |

FOREIGN PATENT DOCUMENTS

| | | | |
|---|---|---|---|
| JP | 2003222616 A | * | 8/2003 |
| KR | 100631060 | | 5/2006 |
| KR | 20080111723 A | * | 12/2008 |

OTHER PUBLICATIONS

Ghim, Young-Sik, Amit Suratkar, and Angela Davies. "Reflectometry-based wavelength scanning interferometry for thickness measurements of very thin wafers." Optics express18.7 (2010): 6522-6529. (Year: 2010).*

J.Schwider et al., "Dispersive interferometric profilometer," Optics Letters, vol. 19, No. 13, Jul. 1, 1994, pp. 995-998.

U. Schnell et al., "Dispersive white-light interferometry for absolute distance measurement with dielectric multilayer systems on the target," Optic Letters, vol. 21, No. 7, Apr. 1, 1996, pp. 528-530.

* cited by examiner

APPARATUS FOR MEASURING THICKNESS AND SURFACE PROFILE OF MULTILAYERED FILM STRUCTURE USING IMAGING SPECTRAL OPTICAL SYSTEM AND MEASURING METHOD

TECHNICAL FIELD

The present disclosure relates to an apparatus for measuring a thickness and a surface profile of a multilayered film structure using an imaging spectral optical system and a measuring method.

BACKGROUND ART

As a measuring method for measuring a thickness of a thin film, a reflected light measuring method has been applied. FIG. 1 illustrates a diagram illustrating a basic structure of a reflected light measuring unit for measuring a thickness of a thin film of the related art.

As illustrated in FIG. 1, it is understood that the reflected light measuring unit for measuring a thickness of a thin film of the related art is substantially configured to include a light source 11, a beam splitter 2, a condensing lens 3, and a detector 4. Light is emitted from the light source 11 and the emitted light is split by the beam splitter 2 at a ratio of 50:50. Among split light, the reflected light is collected by the condensing lens 3 to be irradiated onto an object 1 to be measured.

The irradiated light is divided into light which is reflected from an upper layer of the object 1 to be measured and light which is reflected from a lower layer thereof and a phase difference between the light is measured and analyzed by the detector 4, thereby measuring the thickness of the thin film.

Further, a measuring method which simultaneously measures the thin film thickness and a surface profile has been actively researched. Specifically, as studies on a dispersive white-light interferometry, measurement of a surface profile and a thickness of a multilayered thin film has been reported by U. Schnell (U Schnell, R. Dandliker, and S. Gray, "Dispersive white-light interferometry for absolute distance measurement with dielectric multilayer systems on the target", Optics Letters, Vol. 21, No. 7, pp. 528 to 530) in 1996 since a profile of a four-step grating has been measured by J. Schwider and Liang Zhou (J. Schwider and Liang Zhou, "Dispersive interferometric profilometer", Optics Letters, Vol. 19, No. 13, pp. 995 to 997) in 1994.

FIG. 2 illustrates a diagram illustrating a measuring apparatus of a thickness and a surface profile of a thin film using an interferometric principle. As illustrated in FIG. 2, it is understood that the measuring apparatus of a thickness and a surface profile of a thin film using an interferometric principle is configured to include a light source 11, a first beam splitter 20, a second beam splitter 23, a first condensing lens 5, a second condensing lens 6, a reference mirror 34, and a detector 4.

According to the measuring apparatus illustrated in FIG. 2, a part of a light source emitted from the light source 11 is reflected by the first beam splitter 20 and the remaining light passes therethrough. The light reflected by the first beam splitter 20 is incident onto the second beam splitter 23. The light reflected by the second beam splitter 23 passes through the second condensing lens 6 and then is reflected by the reference mirror 34 and then reflected by the second beam splitter 23 to be incident onto the detector 4 as second reflected light. In contrast, the light passing through the second beam splitter 23 passes through the first condensing lens 5 to be reflected from the object 1 to be measured and then is incident onto the detector 4 as first reflected light. That is, interference light of the first reflected light and the second reflected light is incident onto the detector 4. The interference light may include both surface profile information and thickness information on the thin film.

FIG. 3 illustrates a perspective view illustrating a structure of a detector configured by an imaging spectrometer. The imaging spectrometer illustrated in FIG. 3 may analyze a light intensity distribution at every wavelength for one line. That is, as illustrated in FIG. 3, the imaging spectrometer 40 is a device which includes a slit 42, a diffractive optical element 43, and a CCD 44 to obtain an image only for one line from an object to be measured and divide the light at every wavelength by the diffractive optical element, thereby obtaining several hundreds of consecutive spectral bands for one line. Therefore, the surface profile and the thickness of the thin film may be measured and analyzed by such an imaging spectrometer.

DISCLOSURE

Technical Problem

Therefore, the present disclosure has been made to solve the above-described problem of the related art. An exemplary embodiment of the present disclosure provides a method and an apparatus for measuring a thickness and a surface profile of a multilayered thin film structure by applying a method for obtaining an absolute reflectance value for an object to be measured having a multilayered thin film using a reflected light measuring method and extracting a phase from an interference signal with a reference mirror using a phase shift algorithm.

In the meantime, other technical objects to be achieved in the present disclosure are not limited to the aforementioned technical objects, and other not-mentioned technical objects will be obviously understood by those skilled in the art from the description below.

Technical Solution

The present disclosure provides a method for measuring a thickness and a surface profile of a multilayered film structure using an imaging spectral optical system to obtain thickness information and surface profile information of an object to be measured coated with a thin film, including a first step of splitting light emitted from a light source into two light paths by a beam splitter; a second step of causing one of the two light paths split in the first step to be incident onto an object to be measured covered with a thin film and then allowing an imaging spectrometer to obtain first reflected light obtained by light reflected from an upper layer and a lower layer of the thin film and interfered with each other; a third step of obtaining second light by causing the remaining light of the two light paths split in the first step to be incident onto a reference mirror and then reflecting the remaining light; a fourth step of obtaining interference light in which the first reflected light and the second reflected light are combined by the imaging spectrometer; a fifth step of calculating an absolute reflectance value by obtaining an interference fringe of the first reflected light; a sixth step of extracting a phase component value having thickness information and surface profile information from the interference fringe of the interference light; a seventh step of measuring thin film thickness information from the absolute reflectance value and the phase component value; and an eighth step of measuring thin film surface profile information from the thin film thickness information measured in the seventh step and the phase component value.

An interferometer module may include a blocking plate which is provided between the beam splitter and the reference mirror to selectively absorb light which is incident onto the reference mirror and in the second step, in a reflected light measuring mode, the blocking plate may absorb the light which is incident onto the reference mirror.

In an interference mode, the blocking plate may perform the second to fourth steps without blocking the light which is incident onto the reference mirror.

The phase component value for measuring the thin film thickness information may be a non-linear component among the phase component values extracted in the sixth step.

The thin film thickness information measured in the seventh step may be measured by the following Equation 1.

$$\zeta(d) = \sum_{i=1}^{n} \left[ \eta |R^E(k_i) - R^T(d; k_i)|^2 + \gamma |\Phi_{non\text{-}linear}^E(k_i) - \Phi_{non\text{-}linear}^T(d; k_i)|^2 \right]$$ [Equation 1]

In Equation 1, $R^E(k_i)$ is an absolute reflectance value for every wavenumber obtained by the imaging spectrometer and $R^T(d_j,k_j)$ is a theoretical absolute reflectance value for every wavenumber by the thin film thickness, $\Phi_{non\text{-}linear}^E(k_i)$ is a non-linear phase component value for every wavenumber obtained by the imaging spectrometer and $\Phi_{non\text{-}linear}^T(d_j,k_i)$ is a theoretical phase component value for every wavenumber by the thin film thickness, and $\eta$ is a weight by the absolute reflectance value and $\gamma$ is a weight by the non-linear phase component value.

The thin film surface profile information measured in the eighth step may be measured using the thin film thickness information obtained by Equation 1, by the following Equation 2.

$$\Phi(h, d_j k_i) = 2k_i h + \Psi(d_j k_i)$$ [Equation 2]
$$h = \frac{\Phi(h, d_j k_i) - \Psi(d_j k_i)}{2k_i}$$

In Equation 2, $\Phi(h,d_j k_i)$ is all the measured phase component values and $\Psi(d; k_i)$ is a theoretical phase component value by the thin film thickness.

The thin film surface profile information measured in the eighth step is measured using the thin film thickness information obtained by Equation 1, by the following Equation 3.

$$\xi(h) = \sum_{i=1}^{n} \left| \frac{\Phi^E(k_i) - \Psi^T(d_j k_i)}{2k_i} - h \right|^2$$ [Equation 3]

In Equation 3, $\Phi^E(k_i)$ is all measured phase component values and $\Psi_T(d; k_i)$ is a theoretical phase component value which is mathematically calculated in advance using the thickness information d of the thin film obtained from Equation 1.

That is, according to the exemplary embodiment of the present disclosure, measurement accuracy of the surface profile information h of the multilayered thin film may be improved through the above-described optimization process. When the thickness information d of the thin film obtained from Equation 1 is used, the surface profile information h may be calculated by Equation 2 or 3. In this case, the thin film thickness information d is a value which includes all thickness information of the multilayered thin films.

A piezoelectric actuator which changes a distance between the interferometer module and the object to be measured may be included and the interference mode may be performed while shifting the phase by a distance set as much as the number set by the piezoelectric actuator.

An interference signal of the interference light may be measured at every phase shift and the phase component value may be extracted through the phase shift algorithm.

The phase shift algorithm may include step 6-1 of assuming the reference phase as an arbitrary value $\delta_j^0$; step 6-2 of applying $\delta_j^k$ to the following Equation 4 to calculate $C_i^k$ and $S_i^k$ which minimize an error function $E_i$; step 6-3 of applying $C_i^k$ and $S_i^k$ obtained in step 6-2 to the following Equations 5 and 6 to calculate $\delta_j^{k+1}$ which minimizes the error function $E_j$; step 6-4 of confirming whether $\delta_j^{k+1}$ satisfies a condition of $|\delta_j^{k+1} - \delta_j^k| \le \varepsilon$ while being converged and when the condition is not satisfied, increasing a repetition number k to repeat steps 6-2 and 6-3; and step 6-5 of applying $\delta_j^{k+1}$ to the following Equation 4 to calculate $C_i^k$ and $S_i^k$ which minimize an error function $E_i$, and then calculating the phase component value by the Equation 7.

$$\begin{bmatrix} a & b \\ b & c \end{bmatrix} \begin{bmatrix} C_i \\ S_i \end{bmatrix} = \begin{bmatrix} d_i \\ e_i \end{bmatrix}$$ [Equation 4]

In Equation 4, $$a = \sum_{j=1}^{m} (\cos\delta_j - 1)^2, \ b = \sum_{j=1}^{m} \sin\delta_j (\cos\delta_j - 1),$$

$$c = \sum_{j=1}^{m} \sin^2\delta_j$$

$$d_i = \sum_{j=1}^{m} \hat{\mathbb{I}}_{ij} (\cos\delta_j - 1)^2, \ e_i = \sum_{j=1}^{m} \hat{\mathbb{I}}_{ij} \sin\delta_j$$

$$\begin{bmatrix} f & g \\ g & h \end{bmatrix} \begin{bmatrix} \cos\delta_j \\ \sin\delta_j \end{bmatrix} = \begin{bmatrix} s_j \\ t_j \end{bmatrix}$$ [Equation 5]

In Equation 5, $$f = \sum_{i=1}^{n} C_i^2, \ g = \sum_{i=1}^{n} C_i S_i, \ h = \sum_{i=1}^{n} S_i^2$$

$$s_i = \sum_{i=1}^{n} \hat{\mathbb{I}}_{ij} C_i + \sum_{i=1}^{n} C_i^2, \ t_i = \sum_{i=1}^{n} \hat{\mathbb{I}}_{ij} S_i + \sum_{i=1}^{n} C_i S_i$$

$$\tan\delta_j = \frac{\sin\delta_j}{\cos\delta_j} = \frac{ft_j - gs_j}{hs_j - gt_j}$$ [Equation 6]

$$\tan\Phi_i = \frac{S_i}{C_i} = \frac{ae_i - bd_i}{cd_i - be_i}$$ [Equation 7]

As another category, the present disclosure provides an apparatus for measuring a thickness and a surface profile of a multilayered film structure using an imaging spectral optical system to obtain thickness information and surface profile information of an object to be measured coated with a thin film including an illumination optical module having a light source which emits light; an interferometer module having a beam splitter which splits light emitted from the illumination optical module, a reference mirror which emits second reflected light by causing some light split by the beam splitter to be incident thereon and then reflecting the light, and a blocking plate which selectively blocks the some light which is incident onto the reference mirror; a piezoelectric actuator which changes a distance between the interferometer module and the object to be measured configured by a multilayered thin film; a plate driver which drives the blocking plate to selectively block the some light which is incident onto the reference mirror; and an imaging spectrometer module which causes the remaining light of the split light to be incident onto an object to be measured covered with a thin film and then obtains first reflected light obtained by light reflected from an upper layer and a lower layer of the thin film being interfered with each other and obtains interference light obtained by combining the first reflected light and the second reflected light to calculate an absolute reflectance value from an interference fringe of the first reflected light and extract a phase component value having thickness information and surface profile information from the interference fringe of the interference light, measure thin film thickness information from the absolute reflectance value and the phase component value, and measure thin film surface profile information from the measured thin film thickness information and the phase component value.

The imaging spectrometer module may measure the thin film thickness information from the absolute reflectance value and a non-linear phase component value extracted from the phase component value.

In a reflected light measuring mode, the plate driver may drive the blocking plate to block light which is incident onto the reference mirror and in an interference mode, the plate driver may drive the blocking plate so as not to block the light which is incident onto the reference mirror.

The interference mode may be performed while shifting the phase by a distance set as much as the number set by the piezoelectric actuator.

An interference signal of the interference light may be measured at every phase shift and the phase component value may be extracted through the phase shift algorithm.

Advantageous Effects

According to the exemplary embodiment of the present disclosure, a thickness and a surface profile of a multilayered thin film structure may be measured by applying a method for obtaining an absolute reflectance value for an object to be measured having a multilayered thin film using a reflected light measuring method and extracting a phase from an interference signal with a reference mirror using a phase shift algorithm.

However, effects to be achieved in the present disclosure are not limited to the aforementioned effects, and other not-mentioned effects will be obviously understood by those skilled in the art from the description below.

DESCRIPTION OF DRAWINGS

The accompanying drawings in the specification illustrate an exemplary embodiment of the present disclosure. The technical spirit of the present disclosure will be more clearly understood from the following detailed description taken in conjunction with the accompanying drawings. Therefore, the present disclosure will not be interpreted to be limited to the drawings.

Figure 1:
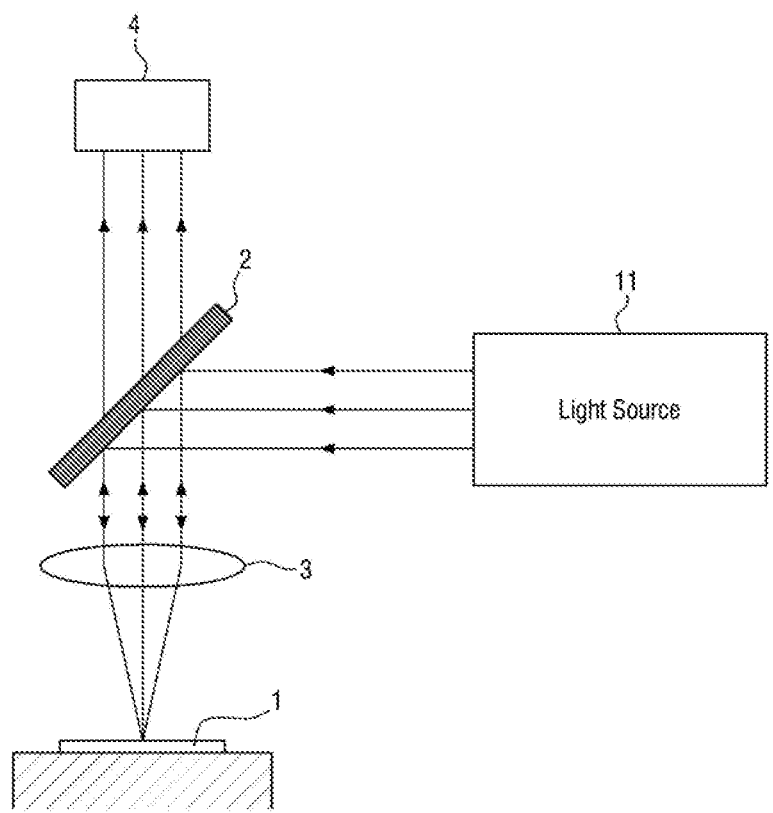
FIG. 1 is a diagram illustrating a basic structure of a reflected light measuring unit for measuring a thin film thickness of the related art.
Figure 2:
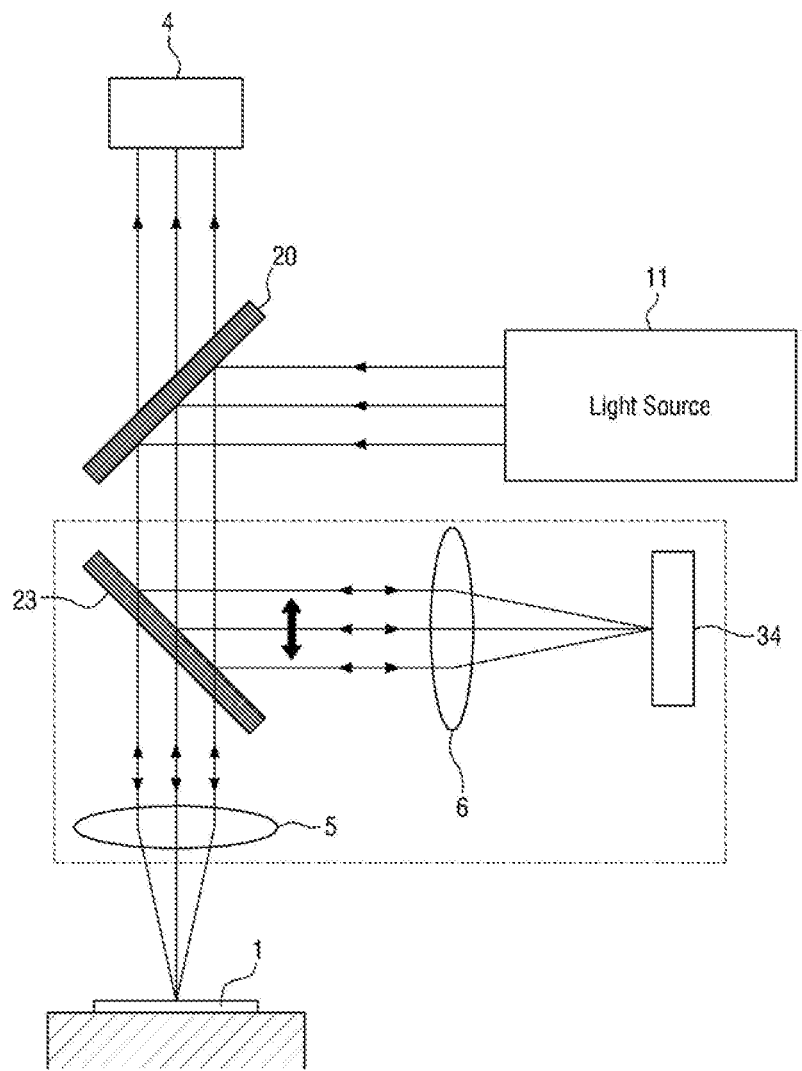
FIG. 2 is a diagram illustrating a measuring apparatus of a thickness and a surface profile of a thin film using an interferometric principle.
Figure 3:
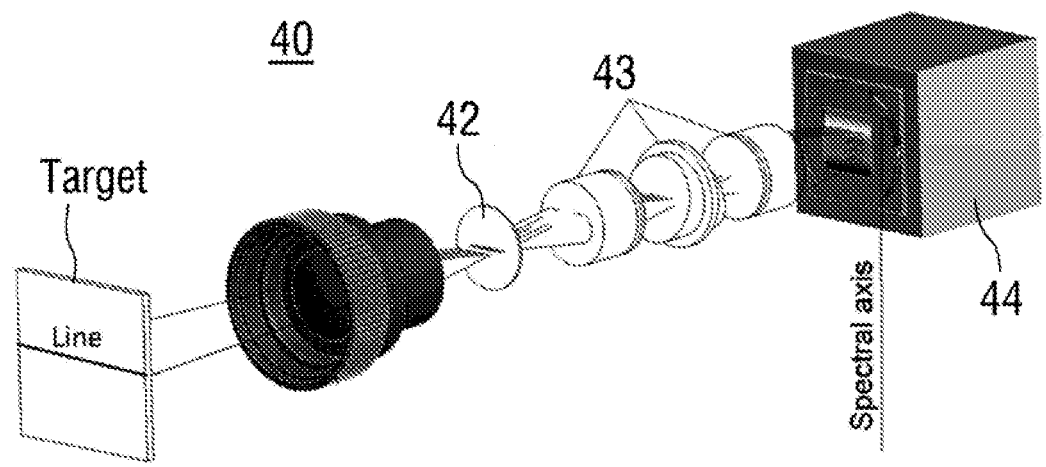
FIG. 3 is a perspective view illustrating a structure of a detector configured by an imaging spectrometer.

| Description of Main Reference Numerals of Drawings | |
|---|---|
| 1: Object to be measured | 2: Beam splitter |
| 3: Condensing lens | 4: Detector |
| 5: First condensing lens | 6: Second condensing lens |
| 10: Illumination optical module | 11: Light source |
| 12: Illumination optical system | 20: First beam splitter |
| 30: Interferometer module | 31: Housing |
| 32: First lens | 33: Second beam splitter |
| 34: Reference mirror | 35: Blocking plate |
| 36: Piezoelectric actuator | 40: Imaging spectrometer module |
| 41: Second lens | 42: Slit |
| 43: Diffractive optical element | 44: CCD |

100: Measuring apparatus of thickness and surface profile of multilayered film structure using imaging spectral optical system

BEST MODE

Figure 4:
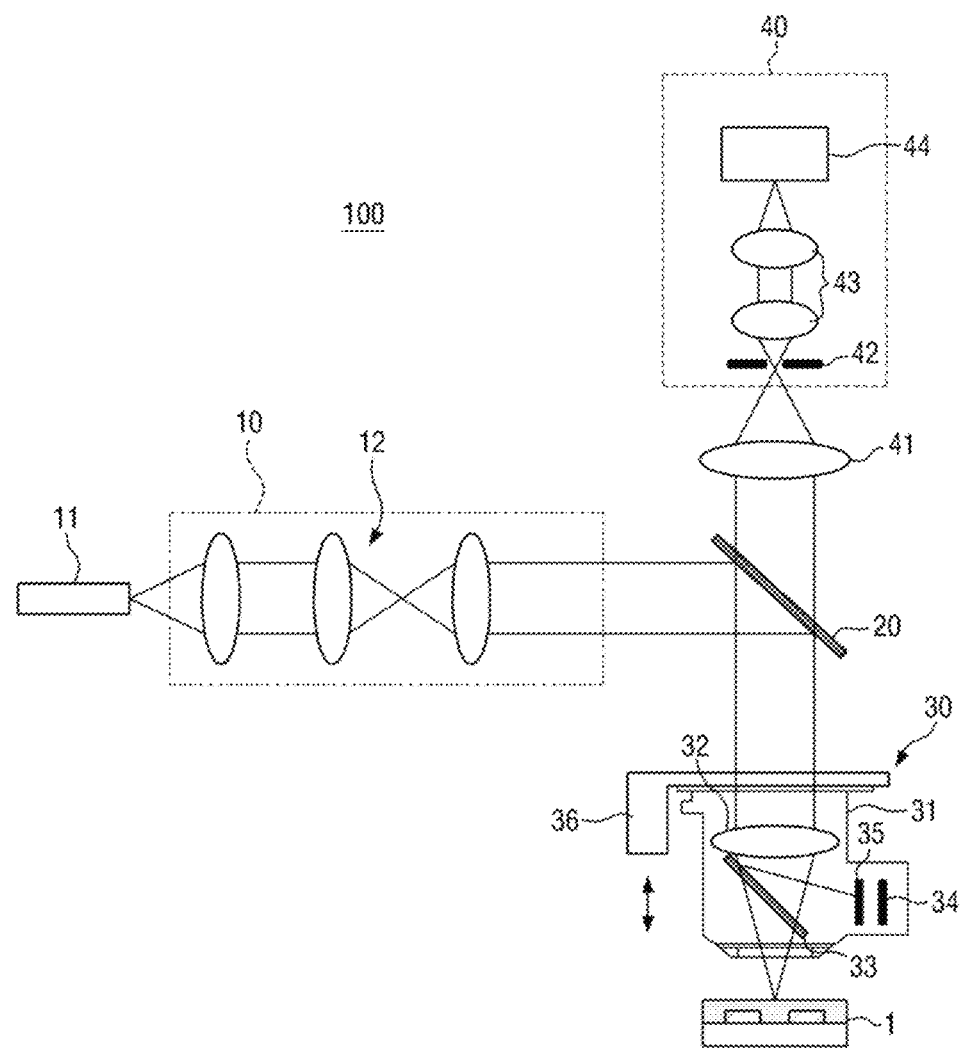
FIG. 4 is a diagram of a measuring apparatus of a thickness and a surface profile of a multilayered film structure using reflected light and interference light according to an exemplary embodiment of the present disclosure in a reflected light measuring mode.

Hereinafter, an apparatus for measuring a thickness and a surface profile of a multilayered film structure using reflected light and interference light according to an exemplary embodiment of the present disclosure and a method for measuring a thickness and a surface profile of a multilayered film structure using the same will be described. First, FIG. 4 illustrates a diagram of a measuring apparatus 100 of a thickness and a surface profile of a multilayered film structure using reflected light and interference light according to an exemplary embodiment of the present disclosure in a reflected light measuring mode. Further, FIG. 5 illustrates a diagram of a measuring apparatus 100 of a thickness and a surface profile of a multilayered film structure using reflected light and interference light according to an exemplary embodiment of the present disclosure in an interference mode.

Figure 5:
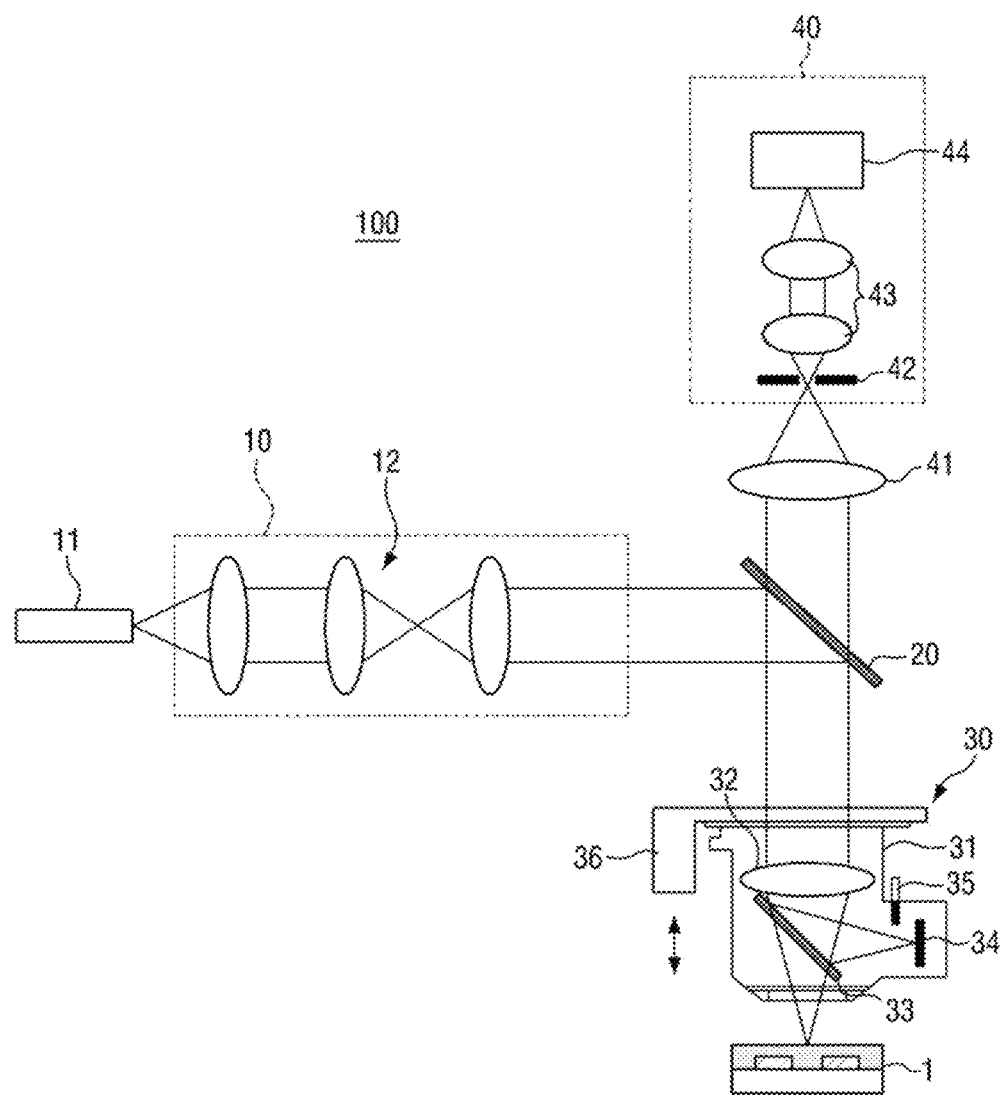
FIG. 5 is a diagram of a measuring apparatus of a thickness and a surface profile of a multilayered film structure using reflected light and interference light according to an exemplary embodiment of the present disclosure in an interference mode.

As illustrated in FIGS. 4 and 5, according to the exemplary embodiment of the present disclosure, it is understood that the blocking plate 35 is driven by the plate driver to select a reflected light measuring mode and an interference mode. Generally, the measuring apparatus 100 of a thickness and a surface profile of a multilayered film structure using reflected light and interference light according to an exemplary embodiment of the present disclosure may be divided into an illumination optical module 10 which allows a beam from the light source 11 with a wide range of wavelengths to be incident onto an object to be measured, an interferometer module 30 which measures reflectance and a phase of the object to be measured, and an imaging spectrometer module 40 which obtains measurement light by a light intensity distribution at every wavelength.

The light source 11 of the illumination optical module 10 may be configured by a tungsten-halogen lamp which emits white light and the white light may be emitted as collimating light with a constant width, by the optical system 12.

The white light which passes through the optical system 12 is incident onto the first beam splitter 20. The first beam splitter 20 splits the incident white light at a ratio of 50:50 and the incident white light is not simultaneously split, but sequentially split in accordance with the measuring process.

A reflection angle of the first beam splitter 20 is approximately 45 degrees with respect to the incident direction of the white light, so that the reflected white light is reflected to be perpendicular to the incident direction. The interferometer module 30 is located in accordance with the reflection angle of the first beam splitter 20.

The interferometer module 30 according to the exemplary embodiment of the present disclosure is configured to include a first lens 32, a second beam splitter 33, a reference mirror 34, and a blocking plate 35. The first lens 32, the second beam splitter 33, the reference mirror 34, and the blocking plate 35 are mounted in a housing 31. Further, the interferometer module 30 is configured to include a transferring device which moves the housing 31 to the object to be measured.

The white light reflected from the first beam splitter 20 is incident onto the object while passing through the first lens 32. The second beam splitter 33 is located in front of a position where the white light which passes through the first lens 32 is incident onto the object, that is, in front of an in-focused position. In this case, a part of the light which reaches the second beam splitter 33 passes through the second beam splitter 33 to be irradiated onto the object to be measured. Further, in the reflected light measuring mode, the remaining light which is reflected from the second beam splitter 33 is absorbed by the blocking plate 35 to be removed.

In the interference mode, the blocking plate 35 is open, so that the light reflected from the second beam splitter 33 is reflected from the reference mirror 34 and also reflected from the second beam splitter 33 to be emitted.

As described above, the interferometer module 30 is a system configured by the first lens 32, the second beam splitter 33, and the reference mirror 34. Further, the blocking plate 35 is also included in the interferometer module 30 to selectively block the white light so that the interferometer module 30 operates in two modes.

Further, the white light which is split by the second beam splitter 33 to be incident onto the reference mirror 34 and the object to be measured is specifically irradiated onto the object to be measured to undergo changes in an amplitude and a phase. Since the changes in the amplitude and the phase are caused due to surface profile information and thickness information, the information may be separately measured according to the modes depending on whether the blocking plate 35 operates.

The white light irradiated as described above is reflected again to pass through the second beam splitter 33 and then pass through the first lens 32 so that a traveling width of the white light is adjusted again and the white light becomes collimating light. Further, the white light passes through the first beam splitter and the second lens 41 to be incident onto the imaging spectrometer module 40. The imaging spectrometer module 40 is an imaging spectrometer configured by a slit 42, a diffractive optical element 43, and a CCD 44 which obtains an interference fringe due to an optical path difference and the module obtains an interference signal having thickness information and surface profile information of a thin film.

According to the process in every mode, first, in order to obtain the thin film thickness information, the white light split by the second beam splitter 33 is incident onto the object to be measured covered with a multilayered thin film and reflected from an upper layer of the thin film and a lower layer of the thin film and interfered with each other to obtain first reflected light. The blocking plate 35 is turned on to obtain a phase of the first reflected light so that only the thickness information of the thin film may be obtained.

Further, in order to obtain the surface profile information, the blocking plate 35 is turned off to interfere the first reflected light which is reflected from the object to be measured with second reflected light from the reference mirror 34, from the white light split by the second beam splitter 33 to obtain interference light. By doing this, the surface profile information of the thin film may be obtained. That is, the surface information of the thin film including the thickness information of the thin film is obtained from the phase of the interference light so that the thickness information of the thin film and the surface information of the thin film are obtained from the surface information of the thin film in which thin film thickness information obtained from the first reflected light and thickness information of the thin film obtained from the interference light are included.

According to the process in every mode, the first beam splitter 20 is applied to the white light emitted from the light source 11 to be split into two light paths and one of two split white light paths is incident onto the object to be measured covered with the thin film and then first reflected light is obtained by interfering light reflected from the upper layer of the thin film and the lower layer of the thin film with each other. Further, the remaining one white light of two split white light paths is incident onto the reference mirror 34 and then reflected to obtain second reflected light. Here, the first reflected light and the second reflected light are combined to generate interference light.

Further, in the exemplary embodiment of the present disclosure, the transferring device which transfers the interferometer module 30 is included. Therefore, the phase is shifted by the transferring device and the reflected light and the interference light are obtained at every shifted phase so that the thickness and the surface profile of the thin film may be more precisely measured.

The above-described transferring device is configured by a piezoelectric actuator 36 (PZT) and the piezoelectric actuator 36 scans along an optical axis direction to obtain an interference fringe due to the optical path difference by the imaging spectrometer. A precision transferring mechanism is required to transfer the interferometer module 30 by the piezoelectric actuator 36. The piezoelectric actuator 36 may transfer the interferometer module 30 at a nanometer resolution using a position detecting sensor. As a position detector, an electrostatic type or a linear variable differential transformer (LVDT) is widely used.

Mode for the Disclosure

Hereinafter, an experiment result obtained by using the apparatus for measuring a thickness and a surface profile of a multilayered film structure using reflected light and interference light according to the above-mentioned exemplary embodiment of the present disclosure will be described.

Figure 6:
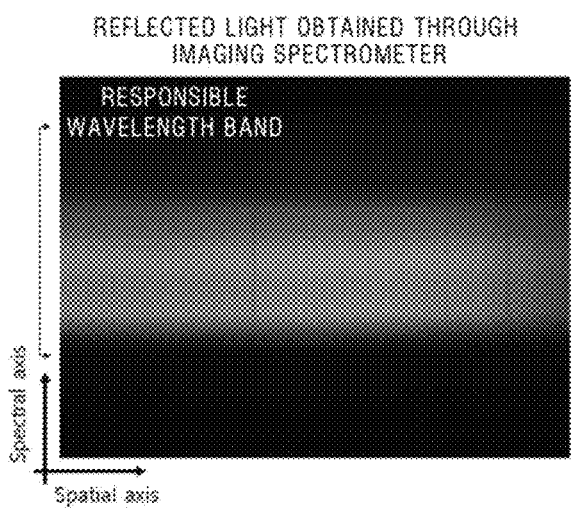
FIG. 6 is an image of reflected light of a single layer thin film specimen obtained by an imaging spectrometer.

First, before manufacturing the above-mentioned measuring apparatus to measure a multilayered thin film, reflectance and an interference fringe of a single layer thin film specimen are obtained. FIG. 6 is an image of reflected light of a single layer thin film specimen obtained by an imaging spectrometer and FIG. 7 is an image of an interference fringe of a single layer thin film specimen obtained by an imaging spectrometer.

Figure 7:
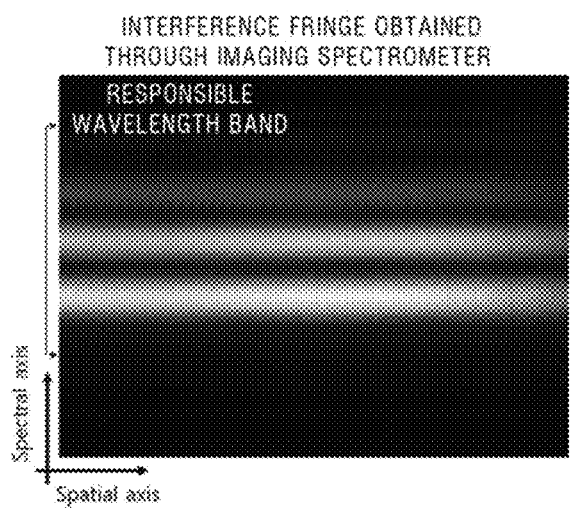
FIG. 7 is an image of an interference fringe of a single layer thin film specimen obtained by an imaging spectrometer.

Currently, the light used as a light source of FIGS. 6 and 7 is tungsten-halogen lamp. Since a spectral distribution of the light source has a Gaussian wavelength distribution approximately from 400 nm to 700 nm, according to a light intensity distribution at every wavelength obtained by the currently used image spectrometer, a spectroscopic image may be obtained only in a partial area (a center part).

Figure 8:
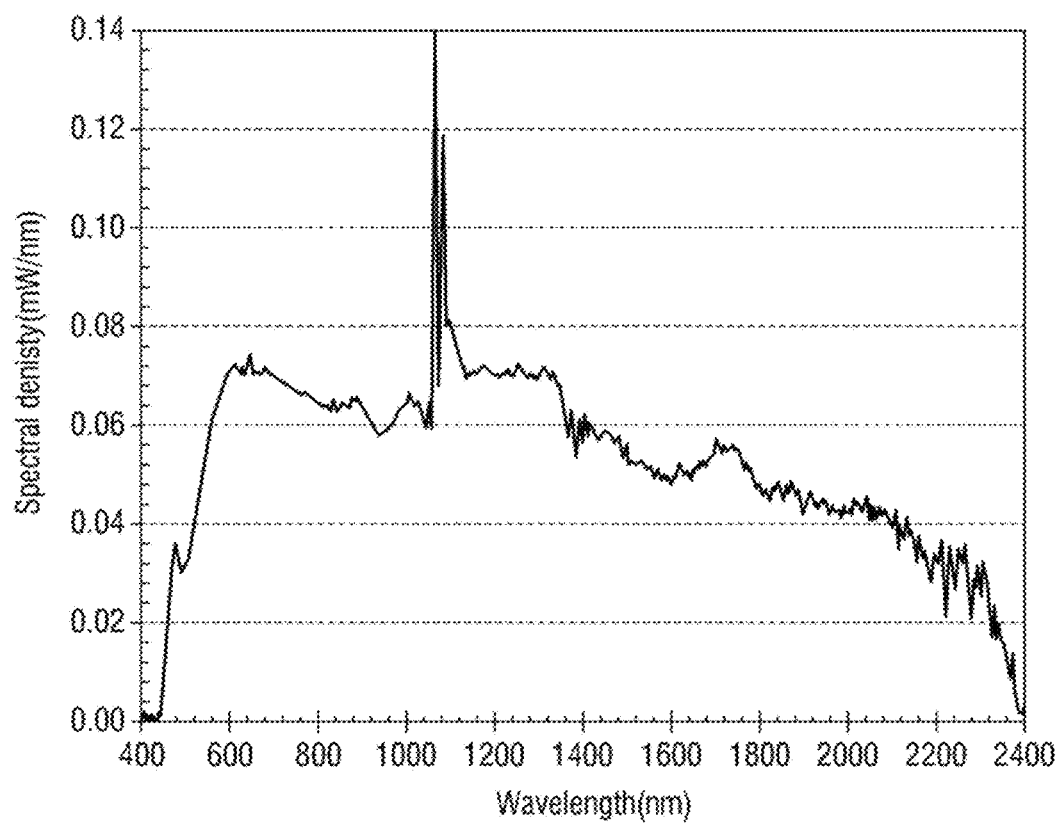
FIG. 8 is a spectrum of a supercontinuum white light source.

In order to expand the light intensity distribution, a light source having a wider broadband distribution may be preferably used. This is because the wider the wavelength band, the more the information (reflectance and phase information at every wavelength) on the specimen to be measured may be obtained. Accordingly, a supercontinuum white light source with a wavelength distribution of 450 nm to 2400 nm is used to broaden the wavelength band. FIG. 8 illustrates a spectrum of a supercontinuum white light source.

Figure 9:
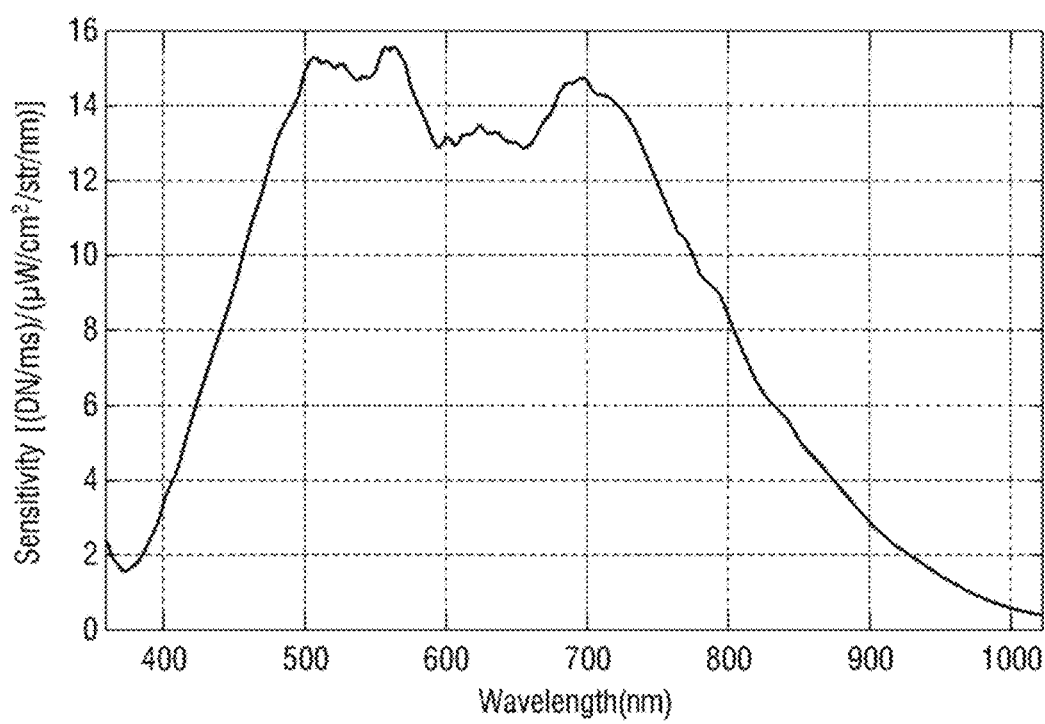
FIG. 9 is a graph illustrating a sensitivity characteristic of a CCD at every wavelength.

As illustrated in FIG. 8, it is understood that the wavelength distribution is broad over an almost entire band from a visible ray band to an infrared ray region. However, since a responsible band of the detector is restrictive, a limit of a wavelength band which may be actually obtained may be determined by the detector. The detector which is used for the experiment of the present disclosure is a CCD and the wavelength distribution band is illustrated in FIG. 9.

Figure 10:
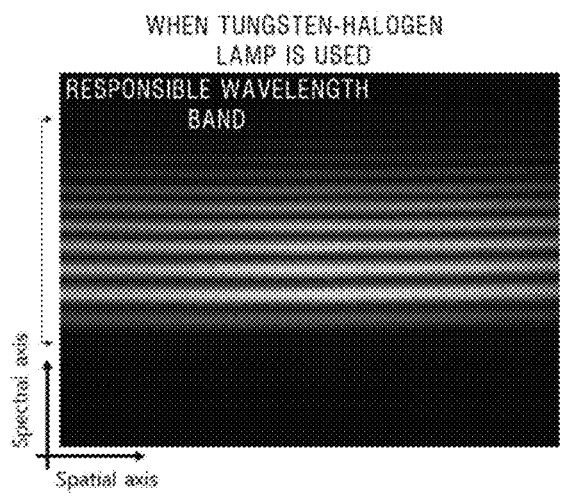
FIG. 10 is an image of an interference fringe when a tungsten halogen lamp is used as a light source.
Figure 11:
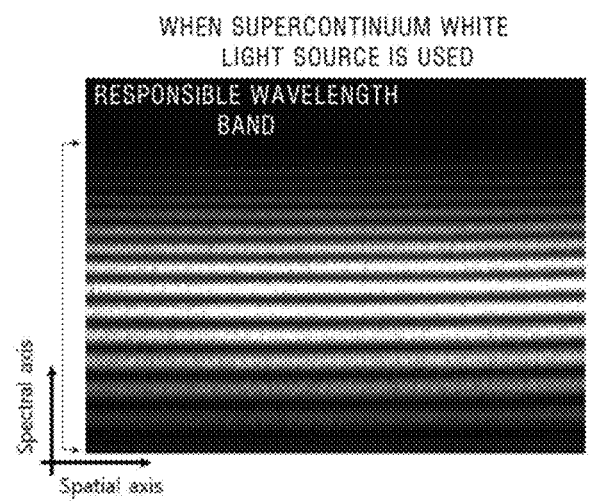
FIG. 11 is an interference fringe image when a supercontinuum white light source is used as a light source.

FIG. 10 illustrates an image of an interference fringe when a tungsten halogen lamp light source is used and FIG. 11 illustrates an image of an interference fringe when a supercontinuum white light source is used. It is understood that, as illustrated in FIGS. 10 and 11, an interference fringe over a wavelength band broader than that when the tungsten-halogen lamp is used as a light source may be obtained, as a result of obtaining an interference fringe at every wavelength through the experiment of the present disclosure.

Figure 12:
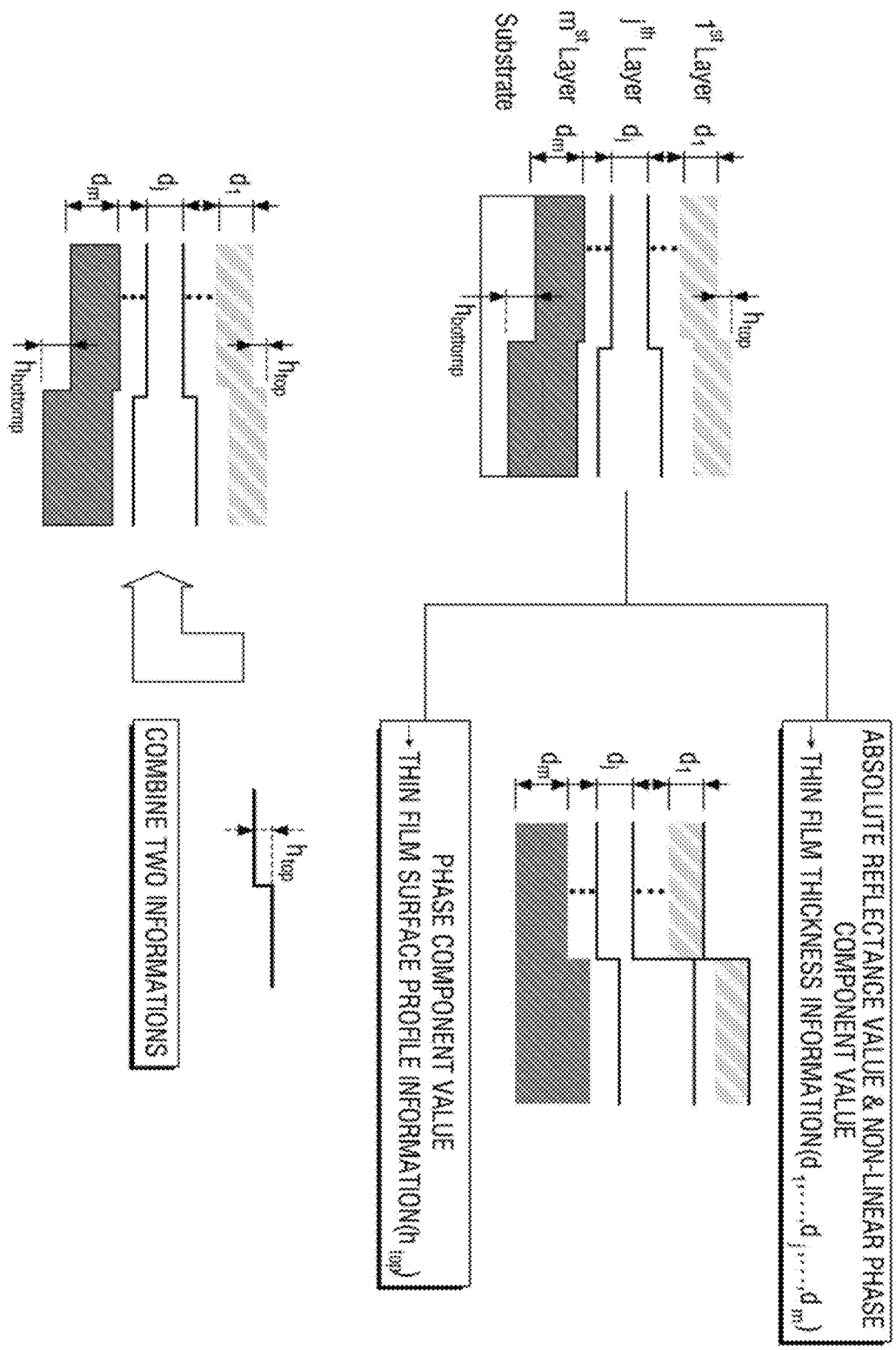
FIG. 12 is a view illustrating a process of calculating thickness and surface profile information of a multilayered film structure according to an exemplary embodiment of the present disclosure.

Hereinafter, a three-dimensional surface profile and thickness measuring algorithm of a multilayered film structure according to the exemplary embodiment of the present disclosure will be described based on the experiment result. FIG. 12 is a view illustrating a process of calculating thickness and surface profile information of a multilayered film structure according to an exemplary embodiment of the present disclosure.

In the exemplary embodiment, a reflected light measuring method and a split white light measuring principle are combined to simultaneously measure the thickness and the surface profile of the thin film. Therefore, as illustrated in FIG. 12, the thickness and the surface profile of a complex structure may be independently measured.

An algorithm which is used to measure the thickness and the surface profile of the multilayered thin film structure according to the exemplary embodiment of the present disclosure uses a method for obtaining an absolute reflectance value of a measurement specimen using a reflected light measuring method and extracting a phase from an interference signal with a reference mirror using a phase shift algorithm.

Figure 13:
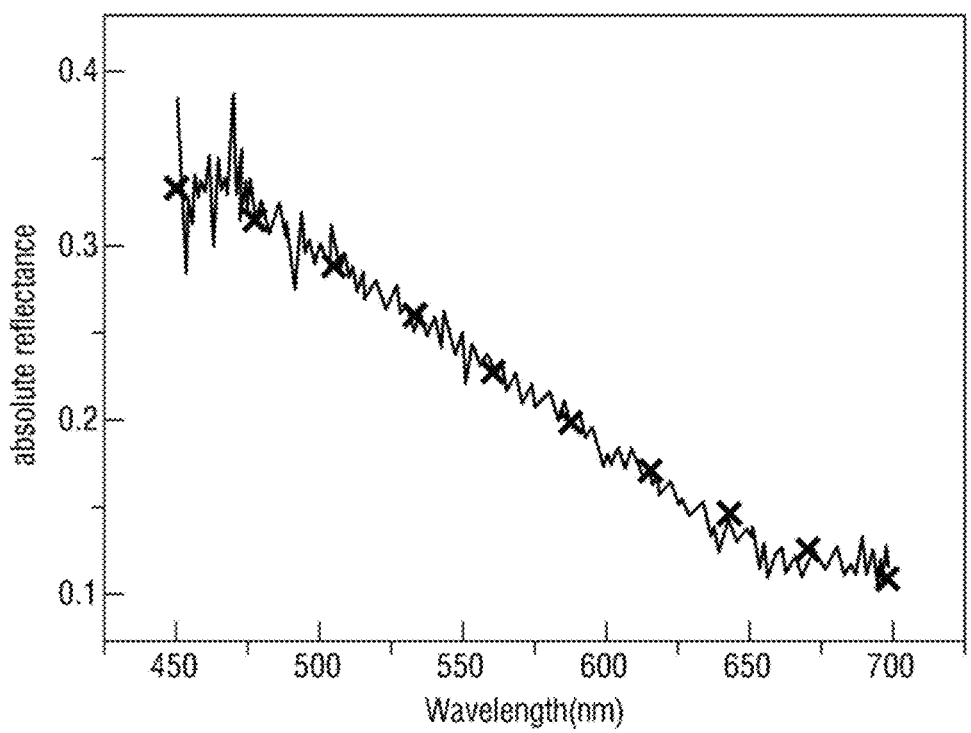
FIG. 13 is a graph of an absolute reflectance measured in a reflected light measuring mode.

FIG. 13 illustrates a graph of an absolute reflectance measured in a reflected light measuring mode. Further, FIG. 14 illustrates a graph of a phase extracted by a phase shift algorithm in an interference mode.

As illustrated in FIG. 13, the interference with the reference mirror is blocked by the blocking plate (a reflected light measuring mode) to obtain an absolute reflectance value of the object to be measured. Further, as illustrated in FIG. 14, the blocking plate is open to obtain a phase component at every wavelength by means of the interference with the reference mirror.

Figure 14:
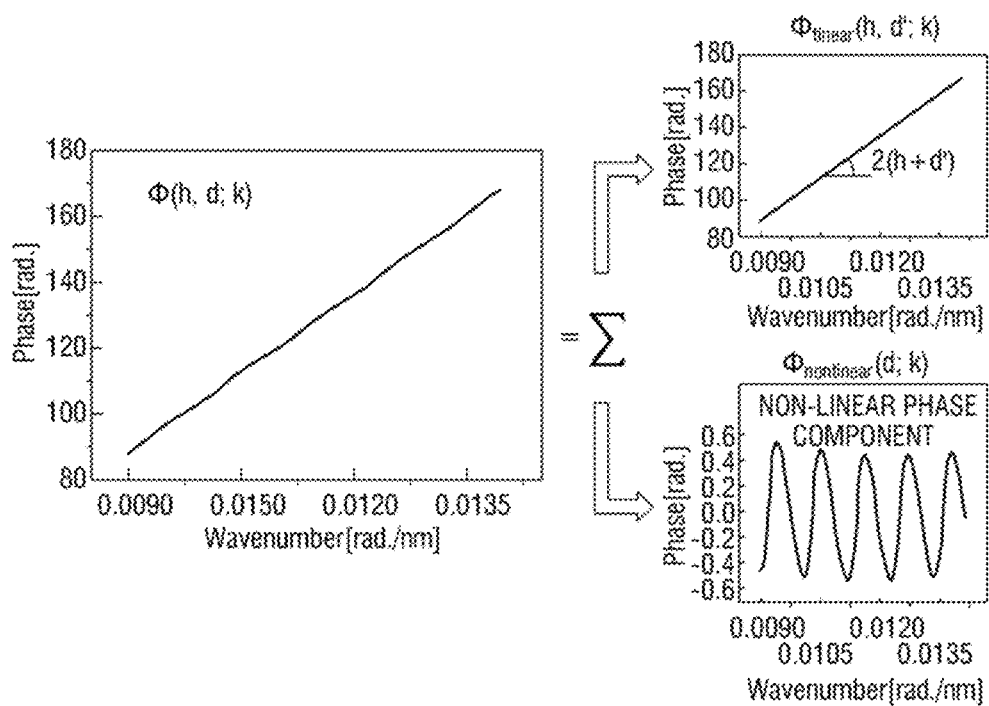
FIG. 14 is a graph of a phase extracted by a phase shift algorithm in an interference mode.

In this case, the obtained phase component is mainly divided into a linear component and a non-linear component as illustrated in FIG. 14. Since a component by the thin film thickness is a non-linear component, a function for a thin film thickness may be configured as represented in Equation 1, using the absolute reflectance and the non-linear phase component of the object to be measured (specimen).

$$\zeta(d) = \sum_{i=1}^{n} [\eta |R^E(k_i) - R^T(d; k_i)|^2 + \gamma |\Phi_{non-linear}^E(k_i) - \Phi_{non-linear}^T(d; k_i)|^2] \quad \text{[Equation 1]}$$

In this case, $R^E(k_i)$ is an absolute reflectance value for every wavenumber obtained by the experiment and $R^T(d_j k_i)$ is a theoretical absolute reflectance value for every wavenumber by a thin film thickness d.

Further, $\Phi_{non-linear}^E(k_i)$ non-linear is a non-linear phase component value for every wavenumber obtained by the experiment and $\Phi_{non-linear}^T(d_j k_i)$ is a theoretical phase component value for every wavenumber by a thin film thickness d.

η refers to a weight by the absolute reflectance value and γ is a weight by the non-linear phase component value. That is, since convergence of the function for the thin film thickness and accuracy of the thin film thickness d vary depending on the weights η and γ, two values need to be adjusted in accordance with the situation.

Since the phase signal by means of the interference with the reference mirror includes both the surface profile information and the thickness information of the thin film as represented in the following Equation 2, the surface profile information h is finally measured using the thin film thickness information d which is obtained from Equation 1.

$$\Phi(h, d_j k_i) = 2k_i h + \Psi(d_j k_i) \quad \text{[Equation 2]}$$
$$h = \frac{\Phi(h, d_j k_i) - \Psi(d_j k_i)}{2k_i}$$

In this case, $\Phi(h, d_j, k_i)$ indicates all measured phase signals and $\Psi(d; k_i)$ is a theoretical phase signal by the thin film thickness. Therefore, when the thin film thickness information d is known, $\Psi(d; k_i)$ may be theoretically calculated.

Alternately, since the phase signal by means of the interference with the reference mirror includes both the surface profile information and the thickness information of the thin film as represented in the following Equation 3, the surface profile information h is finally measured using the thin film thickness information d which is obtained from Equation 1.

$$\xi(h) = \sum_{i=1}^{n} \left| \frac{\Phi^E(k_i) - \Psi^T(d_j k_i)}{2k_i} - h \right|^2 \quad \text{[Equation 3]}$$

In Equation 3, $\Phi^E(k_i)$ is all measured phase component values and $\Psi^T(d; k_i)$ is a theoretical phase component value which is mathematically calculated in advance using the thin film thickness information d obtained from Equation 1.

That is, according to the exemplary embodiment of the present disclosure, measurement accuracy of the surface profile information h of the multilayered thin film may be improved through the above-described optimization process. When the thickness information d of the thin film obtained from Equation 1 is used, the surface profile information h may be calculated by Equation 2. In this case, the thin film thickness information d is a value which includes all thickness information of the multilayered thin film.

Figure 15:
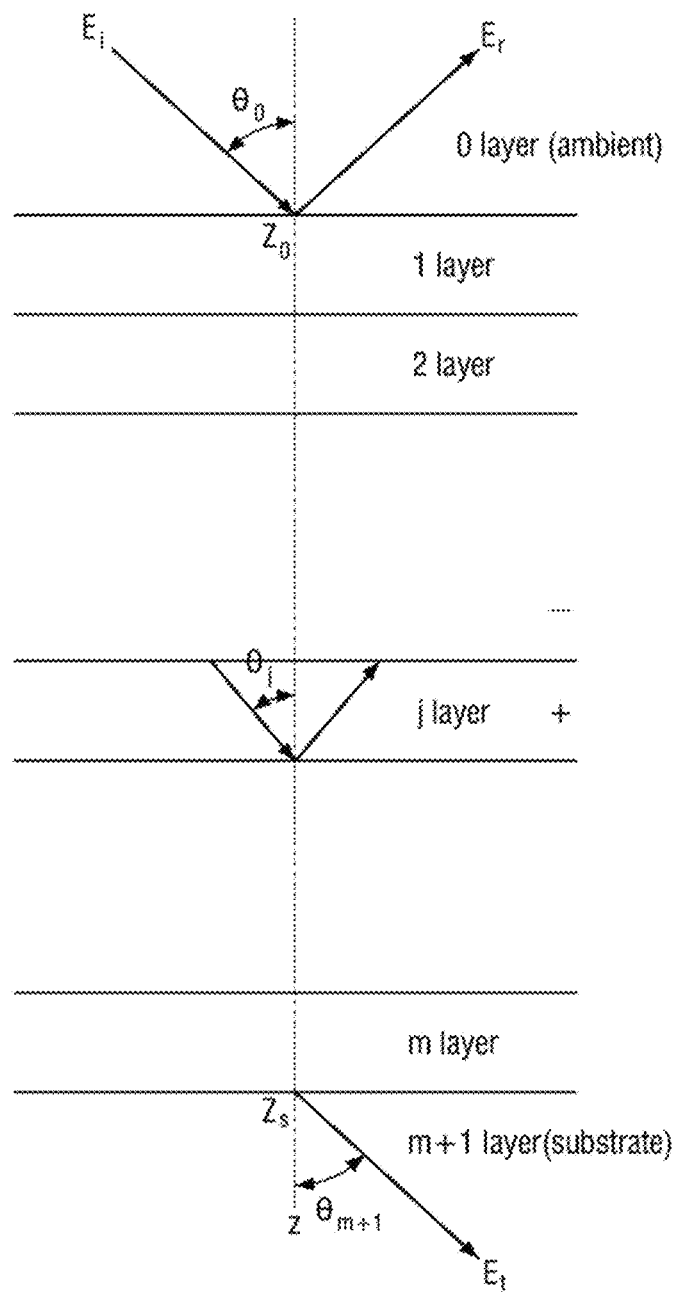
FIG. 15 is a cross-sectional view schematically illustrating reflection and transmission of light in a multilayered thin film.

The theoretical phase component values of multilayered thin films are calculated as described below. FIG. 15 illustrates a cross-sectional view schematically illustrating reflection and transmission of light in a multilayered thin film. As illustrated in FIG. 15, whenever incident light $E_i$ is incident onto each medium in the multilayered thin film structure, the light is repeatedly reflected and transmitted. Therefore, in the complex multilayered thin film structure, it is effective to represent the traveling of the incident light using a determinant.

When a wave front moves in the thin film, a distribution of the incident light $E_i$ on a j-th layer may be mainly classified into light traveling in a z-axis direction and light traveling in an opposite direction. When the z-axis direction is represented by a positive sign (+) and the opposite direction is represented by a negative sign (−), the distribution of light is represented by a matrix as represented in the following Equation 4.

$$E(z) = \begin{bmatrix} E^+(z) \\ E^-(z) \end{bmatrix} \quad \text{[Equation 4]}$$

It is assumed that a relationship of Equation 5 is formed between two arbitrary positions $z_1$ and $z_2$ on a z-axis.

$$\begin{bmatrix} E^+(z) \\ E^-(z) \end{bmatrix} = \begin{bmatrix} S_{11} S_{12} \\ S_{21} S_{22} \end{bmatrix} \begin{bmatrix} E^+(z_2) \\ E^-(z_2) \end{bmatrix} \quad \text{[Equation 5]}$$

Further, Equation 5 may be simply represented by following Equation 6. [Equation 6]

$$E(z_1) = SE(z)$$

In Equation 6, S is defined as a characteristic matrix of the multiple thin film structure. The characteristic matrix is a function which determines a relationship in two arbitrary positions in a thin film and is configured by characteristic matrices on an interface and characteristic matrices of a j-th layer. When light travels from an i-th layer to the j-th layer, the characteristic matrix on the interface is represented by the following Equation 7.

$$I_{ij} = \frac{1}{t_{ij}} \begin{bmatrix} 1 & r_{ij} \\ r_{ij} & 1 \end{bmatrix} \quad \text{[Equation 7]}$$

In Equation 7, $r_{ij}$ and $t_{ij}$ refer to a Fresnel reflection coefficient and transmission coefficient on the i-th layer and the j-th layer, respectively, as represented in Equations 8 to 10. Equation 7 indicates changes in an amplitude and a phase caused when the light is reflected or transmitted from the interface. The characteristic matrix on the j-th layer with a thickness $d_j$ is represented by the following Equation 12.

$$r_{ijp} = \frac{N_j \cos\theta_i - N_i \cos\theta_j}{N_j \cos\theta_i + N_i \cos\theta_j} \quad \text{[Equation 8]}$$

$$\gamma_{ijs} = \frac{N_i\cos\theta_i - N_j\cos\theta_j}{N_i\cos\theta_i + N_j\cos\theta_j} \quad \text{[Equation 9]}$$

$$t_{ijp} = \frac{2N_i\cos\theta_i}{N_j\cos\theta_i + N_i\cos\theta_j} \quad \text{[Equation 10]}$$

$$t_{ijs} = \frac{2N_i\cos\theta_i}{N_i\cos\theta_i + N_j\cos\theta_j} \quad \text{[Equation 11]}$$

Here, $N_i$ and $N_j$ represent complex index of refraction of an incident medium and a transmissive medium, respectively, $r_{ijp}$ and $r_{ijs}$ are Fresnel reflection coefficients of a p wave and an s wave and $t_{ijp}$ and $t_{ijs}$ are Fresnel transmission coefficients of the p wave and the s wave.

$$L_j = \begin{bmatrix} e^{j\frac{\beta}{2}} & 0 \\ 0 & e^{j\frac{\beta}{2}} \end{bmatrix} \quad \text{[Equation 12]}$$

$\beta$ in Equation 12 is represented by the following Equation 13.

$$\beta = 2kNd\cos \quad \text{[Equation 13]}$$

Equation 12 represents a phase change amount caused when light passes through the thin film layer. When it is assumed that the thin film structure is linear, a characteristic matrix when the light travels from the i-th layer to the j-th layer is represented by multiplication of all $I_{ij}$ and $L_{ij}$ matrices between two layers.

When the reflection coefficient is calculated using the above-mentioned Equation 5, a position of $z_0$ is an uppermost surface which abuts on the zero-th layer and $z_s$ is a position of a base layer (substrate). Generally, since it is assumed that light which travels into the base layer does not generate reflected light, $E-(z_s)=0$. When $E-(z_s)=0$ is applied, Equation 5 is represented by the following Equation.

$$\begin{bmatrix} E^+(z_0) \\ E^-(z_0) \end{bmatrix} = \begin{bmatrix} S_{11} & S_{12} \\ S_{21} & S_{22} \end{bmatrix} \begin{bmatrix} E^+(z_s) \\ 0 \end{bmatrix} \quad \text{[Equation 14]}$$

Further, when Equation 14 is used, the reflection coefficient is defined as represented in Equation 15.

$$R = \frac{E^+(z_0)}{E^-(z_0)} = \frac{S_{21}}{S_{11}} \quad \text{[Equation 15]}$$

That is, since $\Psi(d_jk_i)$ represents a phase of the reflection coefficient of Equation 15, $\Psi(d_jk_i)$ is represented by the following Equation 16.

$$\Psi(d_jk_i) = \tan^{-1}\frac{\text{Im}[R]}{\text{Re}[R]} \quad \text{[Equation 16]}$$

Hereinafter, a method of obtaining light interference with the reference mirror which is represented by the above-mentioned Equation 2 or 3 according to the exemplary embodiment of the present disclosure will be described.

In order to obtain a phase from the measured interference fringe, it is necessary to move a reference phase change amount at equal intervals based on a wavelength of a used light source. However, it is actually difficult to precisely move the reference phase change amount at equal intervals in accordance with an entire wavelength band of a multi-wavelength light source used in the present disclosure.

Therefore, a method which under an assumption that the reference phase change is an arbitrary phase regardless of a wavelength of a measuring light source, calculates the reference phase only using a light intensity measured at this time by a repetitive operation is applied to the measuring method according to the present disclosure to calculate a phase. A concept of an arbitrary phase measuring algorithm called A-bucket is as follows.

A light intensity of a j (j=1, . . . , m)-th interference fringe at an arbitrary measuring point i (i=1, . . . , n) is represented by the following equation.

$$I_{ij} = D_j + V_i\cos(\Phi_i - 0) \quad \text{[Equation 17]}$$

Here, $\Phi_i$ is a phase value to be measured including thickness and surface profile information of the thin film and $\delta_j$ indicates a reference phase change value. Therefore, the light intensity before starting the reference phase change ($\delta_0 = 0$) is represented by the following Equation 18.

$$I_{ij} = D_i + V_i\cos(\Phi_j - 0) \quad \text{[Equation 18]}$$

A difference $\psi_{ij}$ between light intensities of Equation 17 and Equation 18 is defined by the following Equation 19.

$$\Psi_{ij} = I_{ij} - V_{i1} = C_i(\cos\delta_j - 1) + S_i\sin\delta_j \quad \text{[Equation 19]}$$

In Equation 20, $C_i = V_i\cos\Phi_i$, $S_i = V_i\sin\Phi_i$.

When it is assumed that an actual measurement value of $\Psi_{ij}$ is $\hat{\Psi}_{ij}$, the phase $\Phi_i$ is a problem for calculating an optimal $\Phi_i$ from $\hat{\Psi}_{ij}$ including an error. Therefore, when an error function is defined by a least square method, the error function is represented by the following Equation 20.

$$E_i = \sum_{j=1}^{n}(\Psi_{ij} - \hat{\Psi}_{ij})^2 = \sum_{j=1}^{n}(C_i(\cos\delta_j - 1 + S_i\sin\delta_j - \hat{\Psi}_{ij})^2 \quad \text{[Equation 20]}$$

A conditional equation for calculating $C_i$ and $S_i$ which minimize the error function of Equation 20 is represented by the following Equation 21.

$$\frac{\partial E_i}{\partial C_i} = \frac{\partial E_i}{\partial S_i} = 0 \quad \text{[Equation 21]}$$

Equation 21 is transformed into a matrix form to be represented by the following Equation 22.

$$\begin{bmatrix} a & b \\ b & c \end{bmatrix}\begin{bmatrix} C_i \\ S_i \end{bmatrix} = \begin{bmatrix} d_i \\ e_i \end{bmatrix} \quad \text{[Equation 22]}$$

In Equation 22, $$a = \sum_{j=1}^{m}(\cos\delta_j - 1)^2, \quad b = \sum_{j=1}^{m}\sin\delta_j(\cos\delta_j - 1),$$

$$c = \sum_{j=1}^{m}\sin^2\delta_j$$

-continued $$d_i = \sum_{j=1}^{m} \hat{\psi}_{ij}(\cos\delta_j - 1)^2, \quad e_i = \sum_{j=1}^{m} \hat{\psi}_{ij}\sin\delta_j$$

when $C_i$ and $S_i$ are calculated in Equation 22, the phase $\Phi_i$ is calculated therefrom as represented in Equation 23.

$$\tan\Phi_i = \frac{S_i}{C_i} = \frac{ae_i - bd_i}{cd_i - be_i} \quad \text{[Equation 23]}$$

Since the phase $\Phi_i$ calculated from Equation 23 is calculated without any constraint on the reference phase, only information on the reference phase $\delta_j$ is required. Therefore, the reference phase value needs to be calculated in order to calculate $C_i$ and $S_i$ in Equation 23.

In order to calculate the reference phase $\delta_j$, the error function of $\psi_{ij}$ is defined by the least square method as represented in Equation 24.

$$E_j = \sum_{i=1}^{n}(\Psi_{ij} - \hat{\psi}_{ij})^2 = \sum_{i=1}^{n}(C_i\cos\delta_j + S_i\sin\delta_j - C_i - \hat{\psi}_{ij})^2 \quad \text{[Equation 24]}$$

When it is assumed that an actual measurement value of $\psi_{ij}$ is $\hat{\psi}_{ij}$, the reference phase $\delta_j$ is a problem for calculating an optimal $\delta_j$ from $\hat{\psi}_{ij}$ including an error. Therefore, when a conditional equation for calculating $\delta_j$ which minimizes the error function is represented by the following Equation 25.

$$\frac{\partial E_j}{\partial \cos\delta_j} = \frac{\partial E_j}{\partial \cos\delta_j} = 0 \quad \text{[Equation 25]}$$

When Equation 25 is represented in the form of matrix, Equation 25 may be represented by the following Equation 26.

$$\begin{bmatrix} f & g \\ g & h \end{bmatrix}\begin{bmatrix} \cos\delta_j \\ \sin\delta_j \end{bmatrix} = \begin{bmatrix} s_j \\ t_j \end{bmatrix} \quad \text{[Equation 26]}$$

In Equation 26, $$f = \Sigma_{i=1}^{n} C_i^2, \quad g = \Sigma_{i=1}^{n} C_i S_i, \quad h = \Sigma_{i=1}^{n} S_i^2$$

$$s_j = \Sigma_{i=1}^{n}\hat{\psi}_{ij}C_i + \Sigma_{i=1}^{n}C_i^2, \quad t_j = \Sigma_{i=1}^{n}\hat{\psi}_{ij}S_i + \Sigma_{i=1}^{n}C_i S_i$$

$\cos\delta_j$ and $\sin\delta_j$ are calculated from Equation 26 and the reference phase $\delta_j$ is calculated therefrom as represented in the following Equation 27.

$$\tan\delta_j = \frac{\sin\delta_j}{\cos\delta_j} = \frac{ft_j - gs_j}{hs_j - gt_j} \quad \text{[Equation 27]}$$

Equation 21 is an equation for calculating $C_i$ and $S_i$ which minimize the error function $E_i$ of each measuring point from the reference phase $\delta_j$ and Equations 26 and 27 are equations for calculating $\delta_j$ which minimizes the error function $E_j$ when $C_i$ and $S_i$ are determined at all measuring points.

Therefore, in order to calculate $C_i$, $S_i$, $\delta_j$ which minimize the error function, a repetitive operation such as the following steps needs to be used. Here, k is the number of repetition.

In step 1, the reference phase is assumed as an arbitrary value $\delta_j^0$.

In step 2, $\delta_j^k$ is assigned to Equation 21 to calculate $C_i^k$ and $S_i^k$ which minimize the error function $E_i$.

In step 3, $C_i^k$ and $S_i^k$ which are calculated in step 2 are assigned to Equations 25 and 26 to calculate $\delta_j^{k+1}$ which minimizes the error function $E_j$.

In step 4, it is confirmed whether $\delta_j^{k+1}$ satisfies the condition of $|\delta_j^{k+1} - \delta_j^k| \leq \varepsilon$ while being converged. When $\delta_j^{k+1}$ does not satisfy the condition, the number of repetition k is increased to repeat steps 2 and 3. In this case, c is a value which is very close to 0.

In step 5, after assigning $\delta_j^{k+1}$ to Equation 27 to calculate $C_i^k$ and $S_i^k$ which minimize the error function $E_i$, the phase $\Phi_i$ is calculated by Equation 23.

In the above steps, whether to be converged and a convergence speed vary depending on the number i ($i=1, \ldots, n$) of data to be measured and the number j ($j=1, \ldots, m$) of phase shifts, and an initial phase estimation value $\delta_j^0$. When it is assumed that the number of data to be measured is n and the number of phase shifts is m, a total number of unknowns is $2n+m-1$ and a total number of equations is $n(m-1)$. Therefore, in order to calculate the only solution, the number of equations needs to be larger than the total number of unknowns so that a relationship represented in Equation 28 needs to be established.

$$n(m-1) \geq 2n + m - 1 \quad \text{[Equation 28]}$$

$$n \geq 1 + \frac{2}{m-3}$$

$$m \geq 3 + \frac{2}{n-1}$$

From the above-described Equation, the number of data to be measured which is required to perform the A-bucket algorithm is at least two and the number of phase shifts is at least four times.

In the experimental example of the present disclosure, the thickness of an arbitrary thin film specimen is measured using a phase shifting method using the above-mentioned A-bucket algorithm and the reflected light measuring method, through a simulation experiment.

Figure 16:
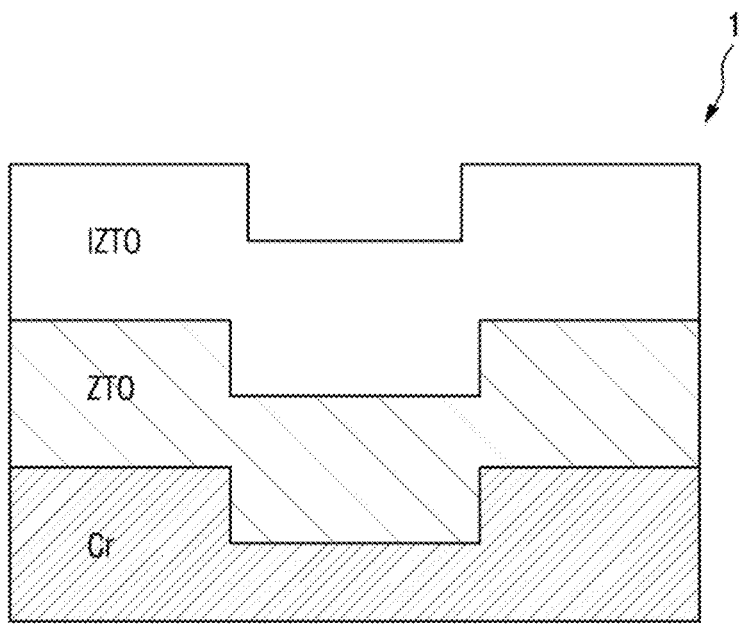
FIGS. 16 to 18 are a structure of a measuring sample in a simulation experiment of the present disclosure.
Figure 17:
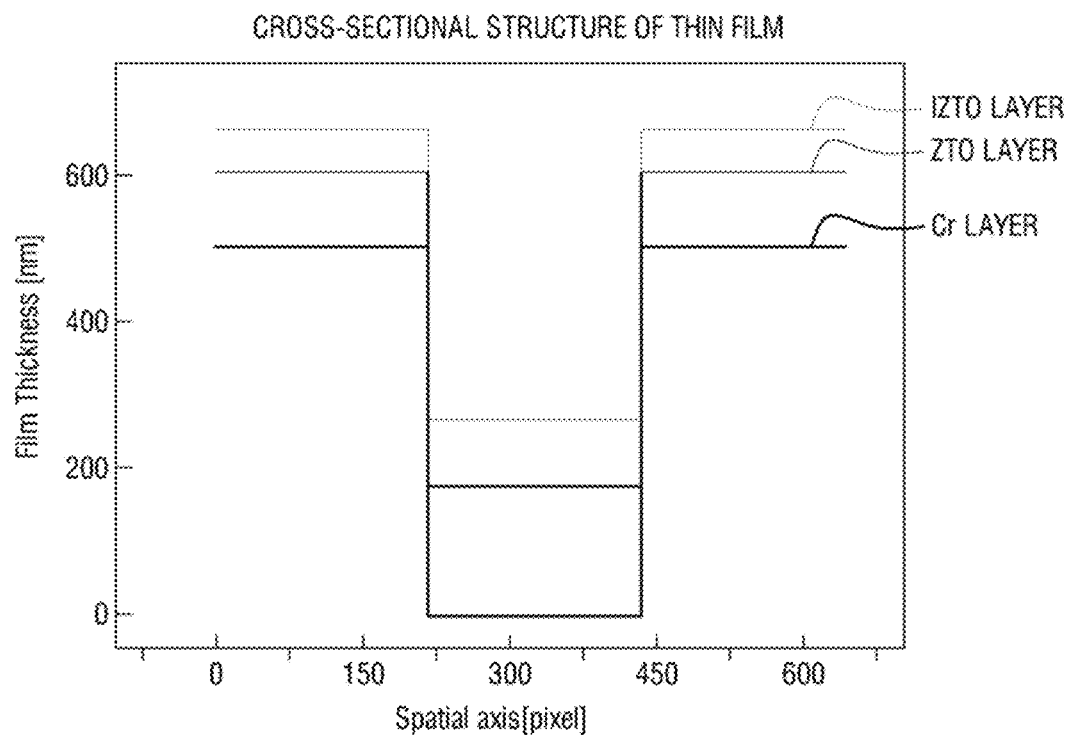
Figure 18:
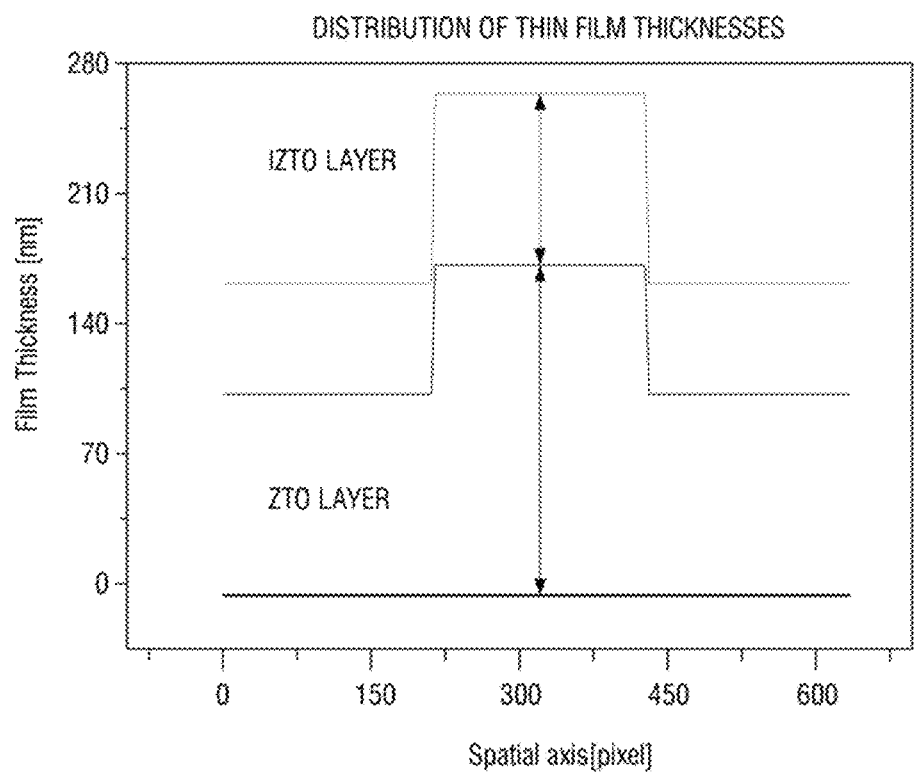

FIGS. 16 to 18 illustrate a structure of a measuring sample in a simulation experiment of the present disclosure. A characteristic of the used light source is assumed that a Gaussian spectrum is distributed from 435 nm to 720 nm in consideration of the characteristic of the wavelength of the tungsten-halogen lamp which is mainly used. Further, a sample to be measured is assumed that two transparent thin film (ZTO layer and IZTO layer) layers with different media are applied on a Cr base layer (substrate) as illustrated in FIGS. 16 to 18.

Figure 19:
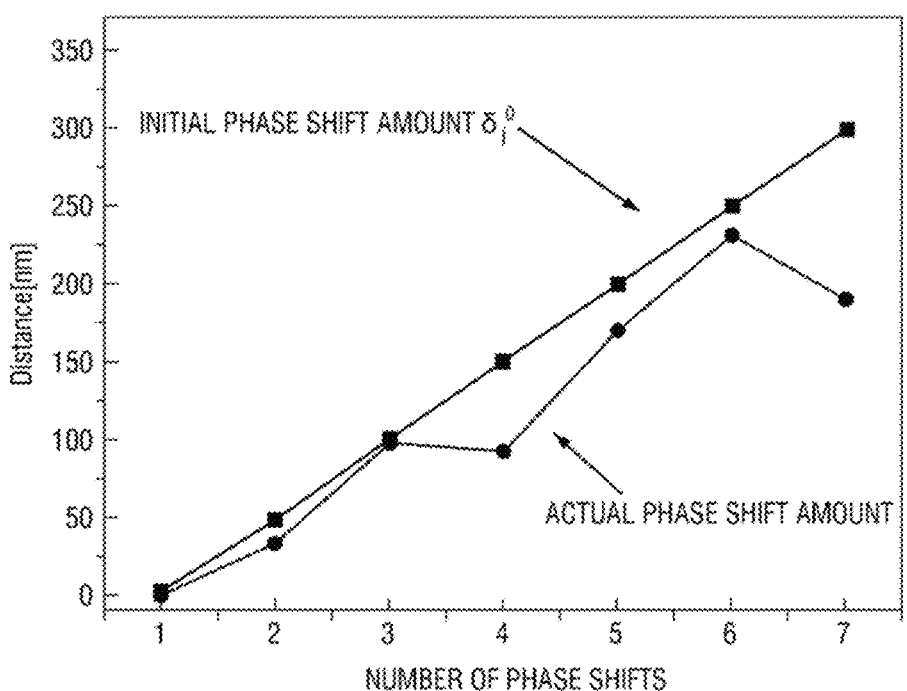
FIG. 19 is a graph of an initial phase shift amount and an actual phase shift amount according to the number of phase shifts.

FIG. 19 illustrates a graph of an initial phase shift amount and an actual phase shift amount according to the number of phase shifts. Even though $\delta_j^0$ which is an existing phase shift value is assumed that a total of six phase shifts are performed at equal intervals of 50 nm, it is assumed that the actual driven phase shift amount is driven at the various intervals of 33 nm, 97 nm, 92 nm, 170 nm, 230 nm, and 190 nm as illustrated in FIG. 19.

Figure 20:
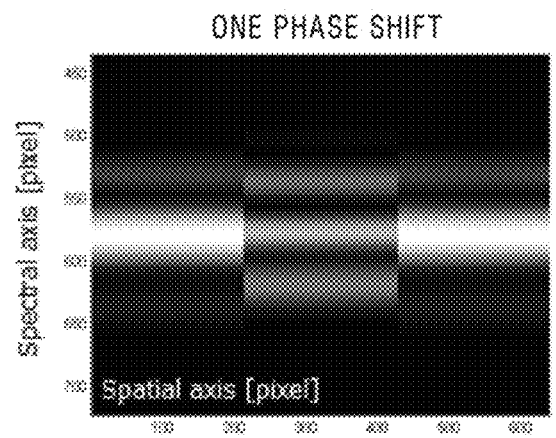
FIGS. 20 to 26 are interference signals of an imaging spectrometer according to the number of phase shifts obtained by the simulation experiment of the present disclosure.
Figure 21:
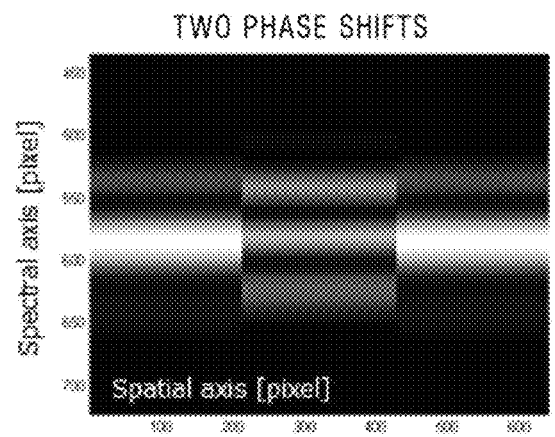
Figure 22:
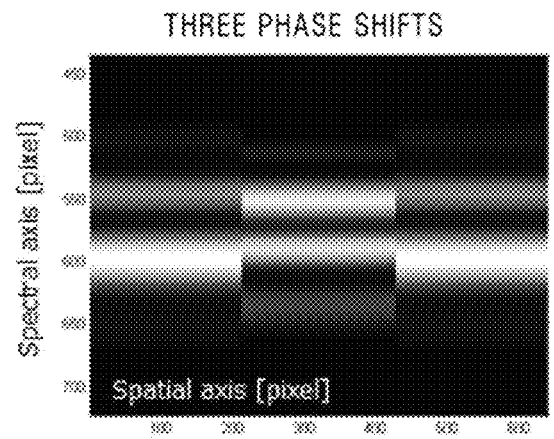
Figure 23:
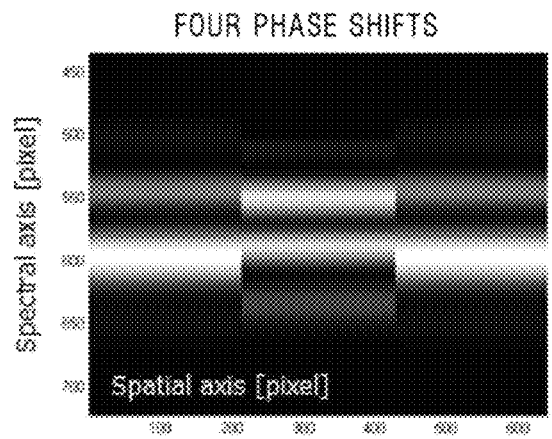
Figure 24:
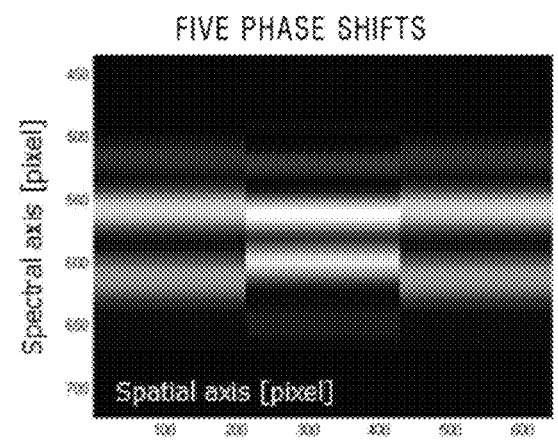
Figure 25:
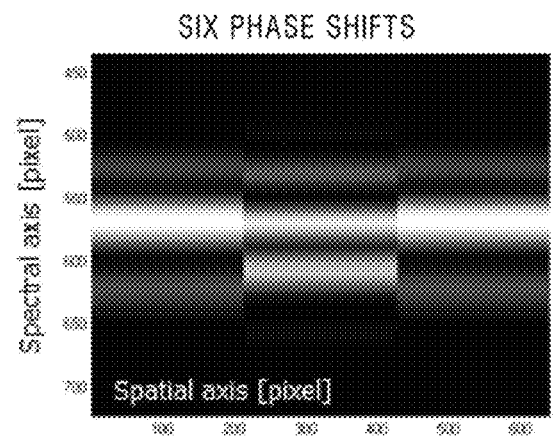
Figure 26:
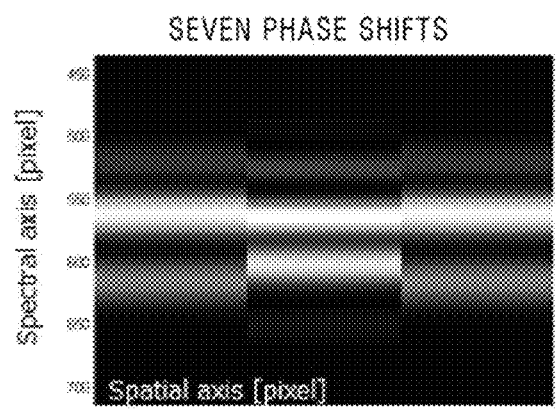

FIGS. 20 to 26 illustrate interference signals of an imaging spectrometer according to the number of phase shifts obtained by the simulation experiment of the present disclosure. That is, FIG. 20 is an interference signal obtained in the imaging spectrometer after one phase shift, FIG. 21 is an interference signal obtained in the imaging spectrometer after two phase shifts, FIG. 22 is an interference signal obtained in the imaging spectrometer after three phase shifts, FIG. 23 is an interference signal obtained in the imaging spectrometer after four phase shifts, FIG. 24 is an interference signal obtained in the imaging spectrometer after five phase shifts, FIG. 25 is an interference signal obtained in the imaging spectrometer after six phase shifts, and FIG. 25 is an interference signal obtained in the imaging spectrometer after seven phase shifts.

Figure 27:
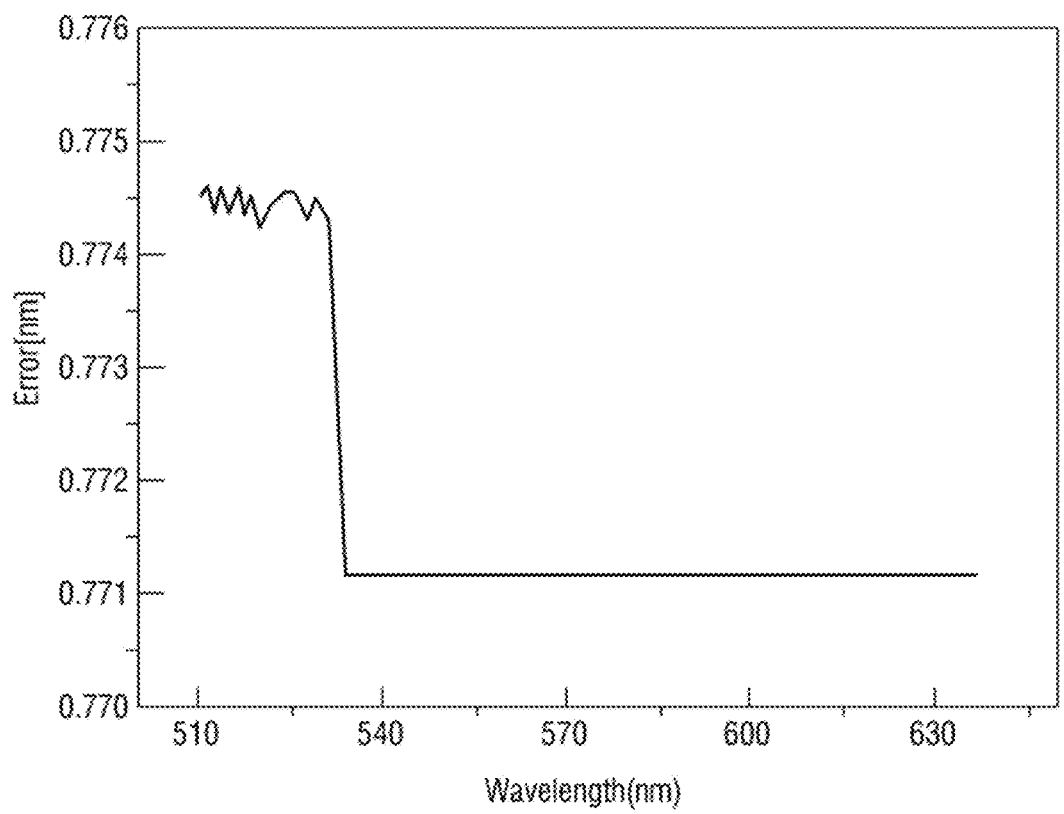
FIG. 27 is a maximum phase shift error amount according to a wavelength obtained by the simulation experiment of the present disclosure.

As a result of comparison of $\delta_j^{k+1}$ which is converged in a wavelength range of the used light source using the A-bucket algorithm which is applied in the present disclosure and the actual phase shift amount, as illustrated in FIG. 27, the phase error amount is 1 nm or lower over the entire wavelength band of the used light source. Therefore, it is understood that the convergence is very high.

Figure 28:
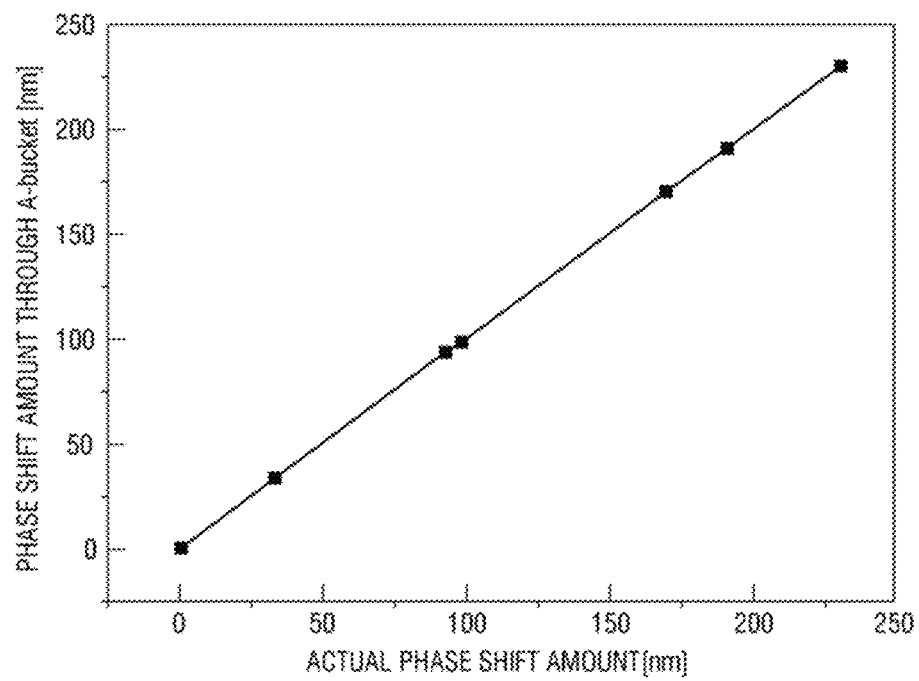
FIGS. 28 and 29 are comparison graphs of a phase shift amount obtained by an A-bucket and an error amount with respect to an actual phase shift amount.
Figure 29:
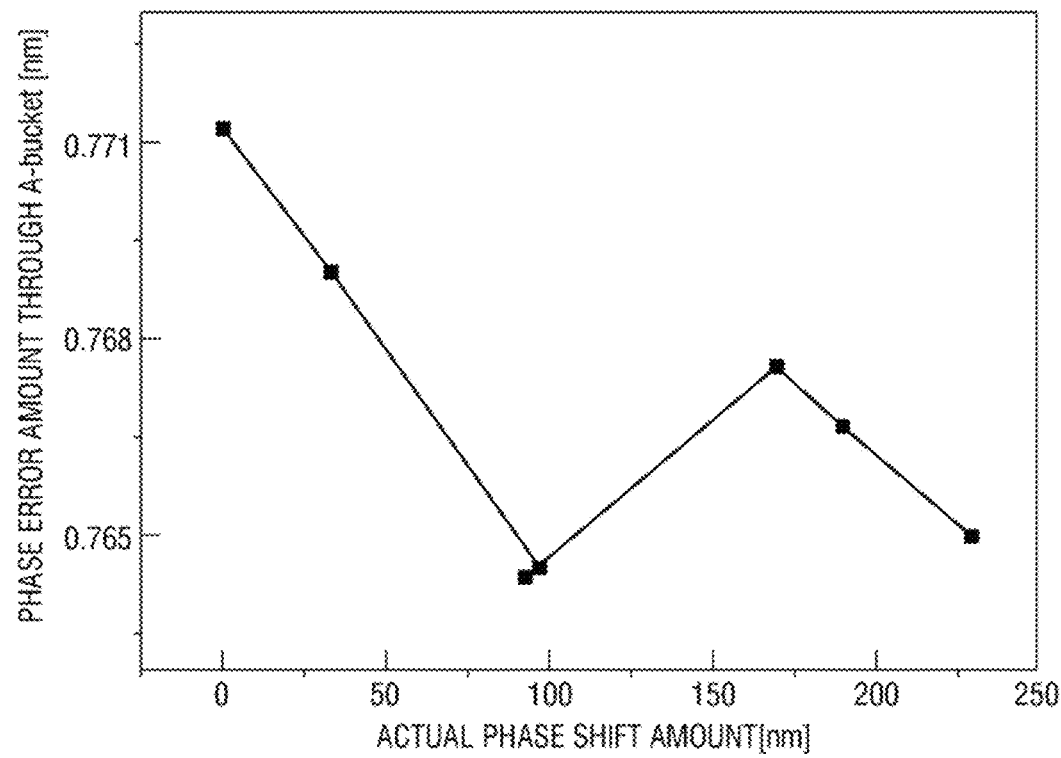

FIGS. 28 and 29 illustrate comparison graphs of a phase shift amount obtained by an A-bucket and an error amount with respect to an actual phase shift amount. That is, when the analysis is performed based on the central wavelength of 570 nm of the light source, the phase shift amount obtained through the A-bucket with respect to the actual phase shift amount is illustrated in FIG. 28 and the error amount is illustrated in FIG. 29.

Figure 30:
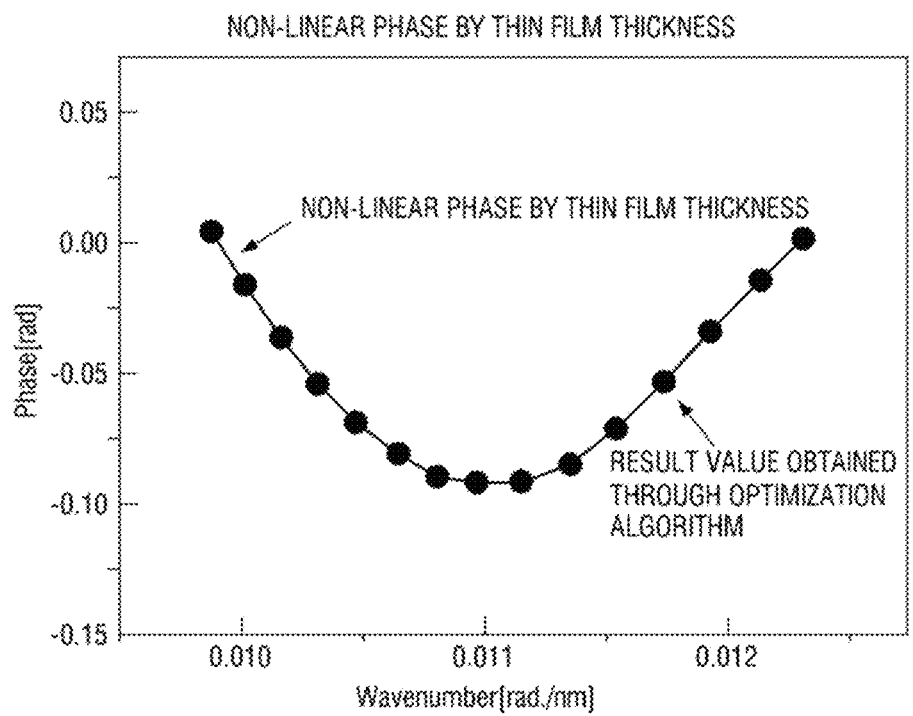
FIG. 30 is a non-linear phase by a thin film thickness.
Figure 31:
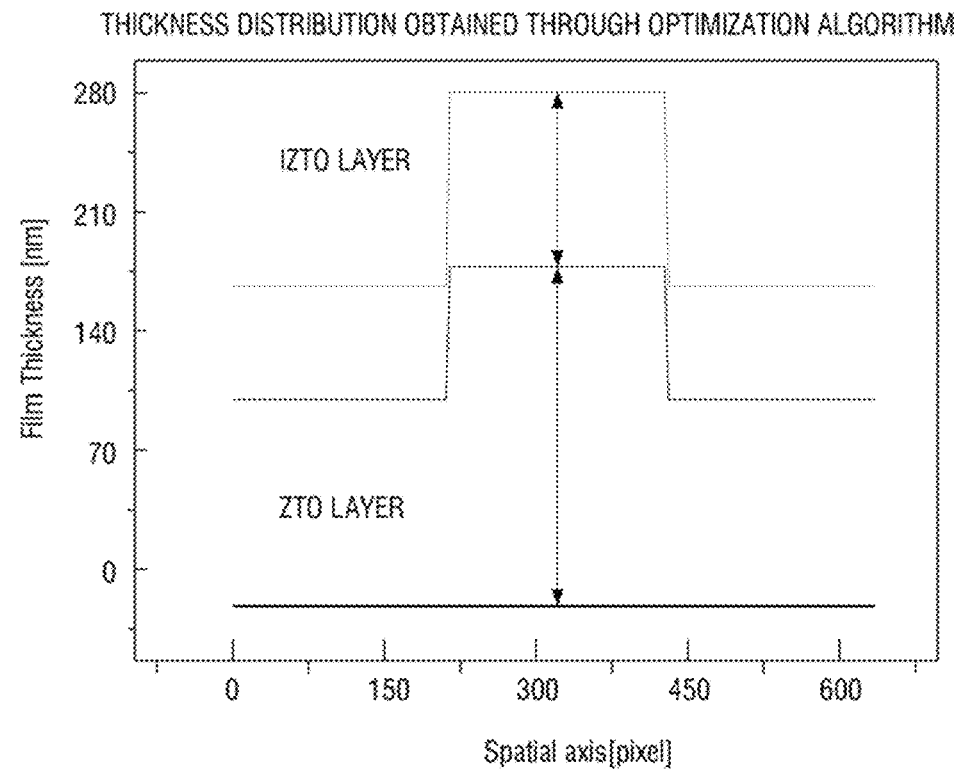
FIG. 31 is a graph of a thickness distribution obtained by an optimization algorithm.
Figure 32:
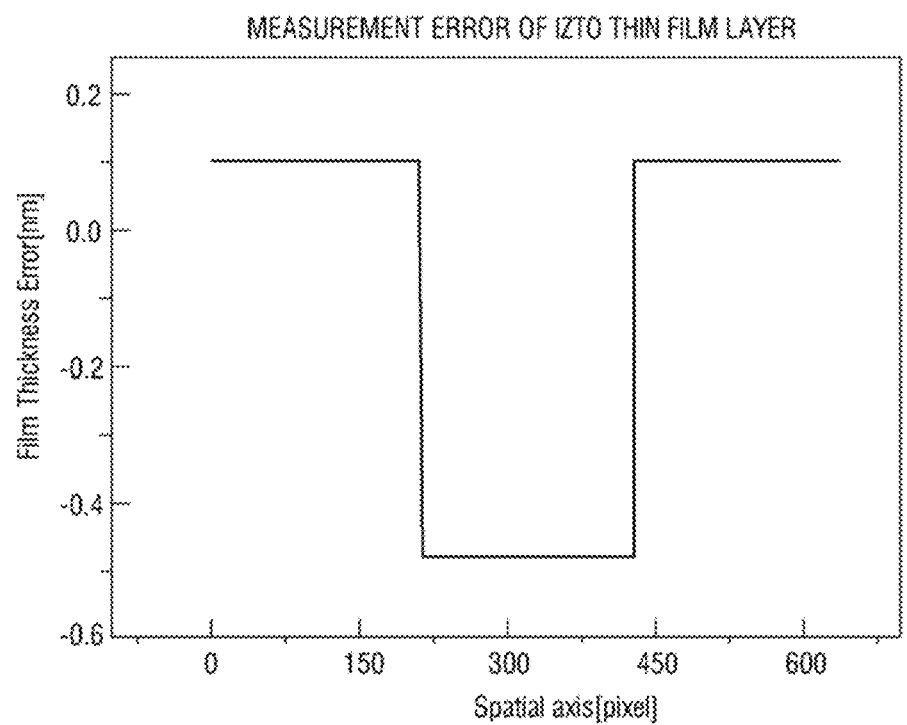
FIG. 32 is a measurement error of an IZTO thin film layer.
Figure 33:
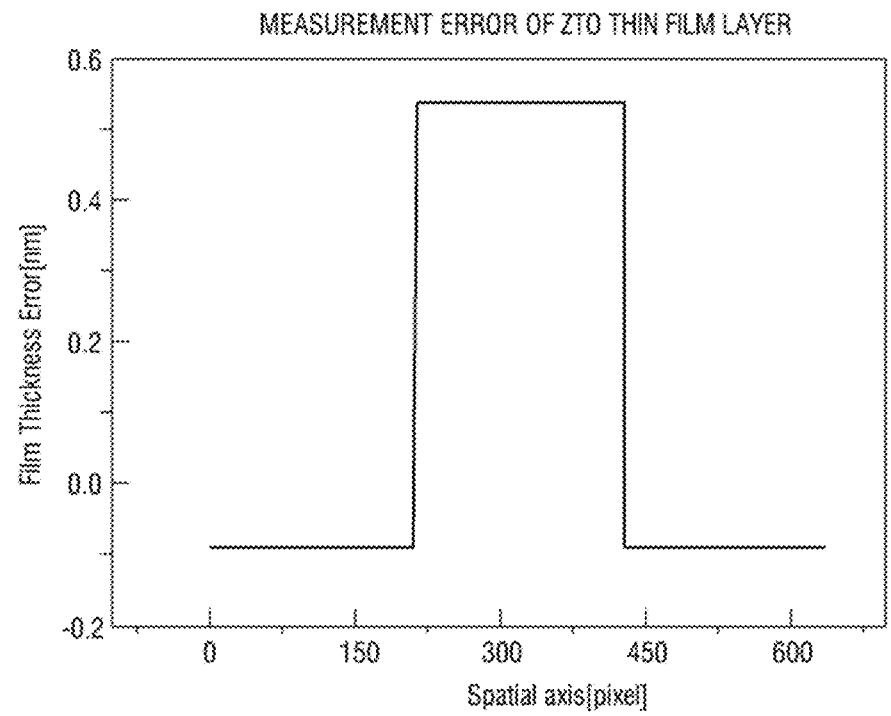
FIG. 33 is a graph of a measurement error of a ZTO thin film layer.

Next, a non-linear phase by the thickness of the thin film is extracted based on the phase shift amount obtained through the A-bucket and the thin film thicknesses of the IZTO layer and the ZTO layer are calculated. FIG. 30 illustrates a non-linear phase by a thickness of a thin film, FIG. 31 illustrates a graph of a thickness distribution obtained by an optimization algorithm, FIG. 32 illustrates a measurement error of an IZTO thin film layer, and FIG. 33 illustrates a graph of a measurement error of a ZTO thin film layer. As illustrated in FIGS. 30 to 33, as the measurement result, it is understood that the error value is approximately 1 nm or lower.

Figure 34:
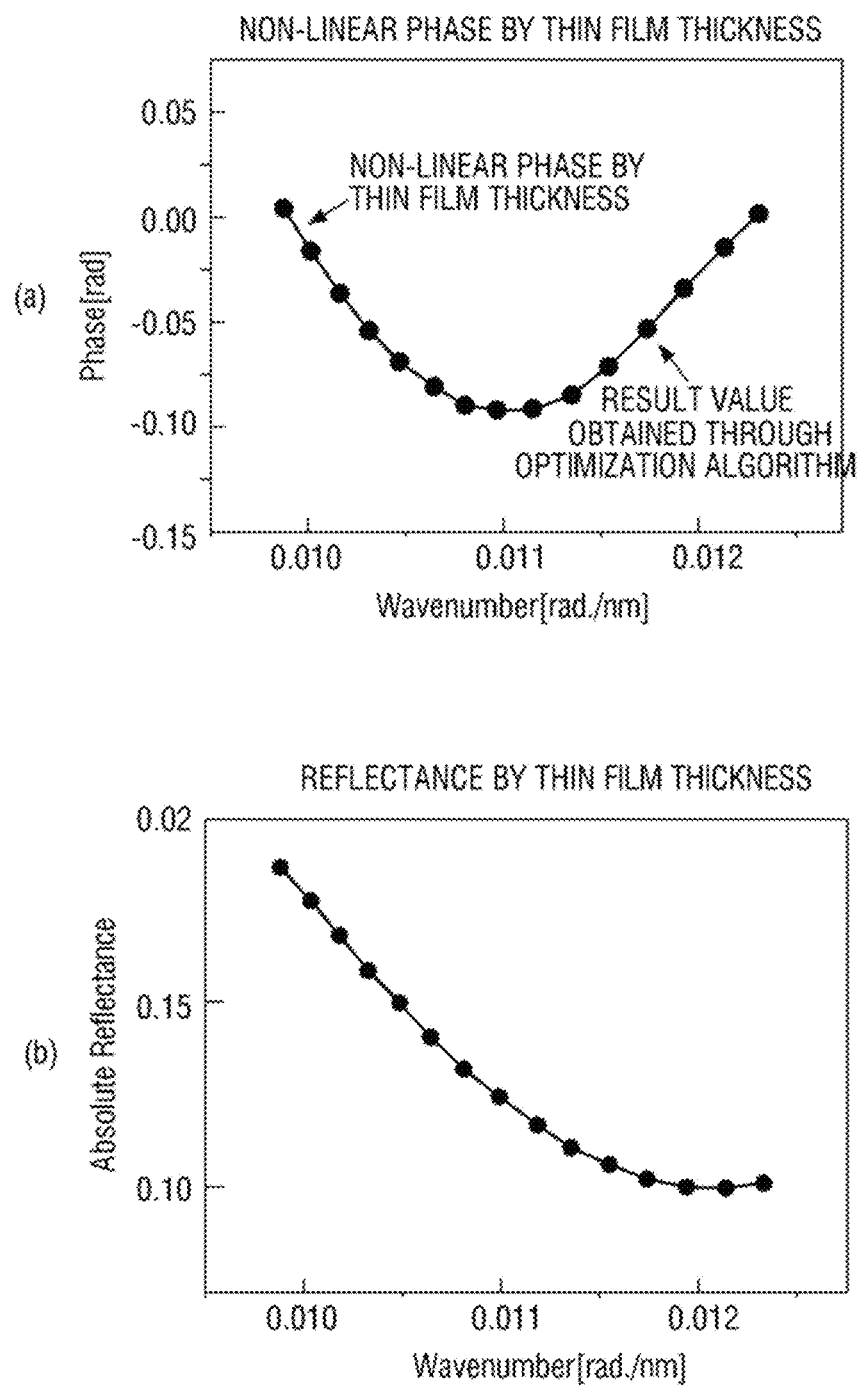
FIG. 34 is a graph of a non-linear phase and reflectance by a thickness of a thin film.
Figure 35:
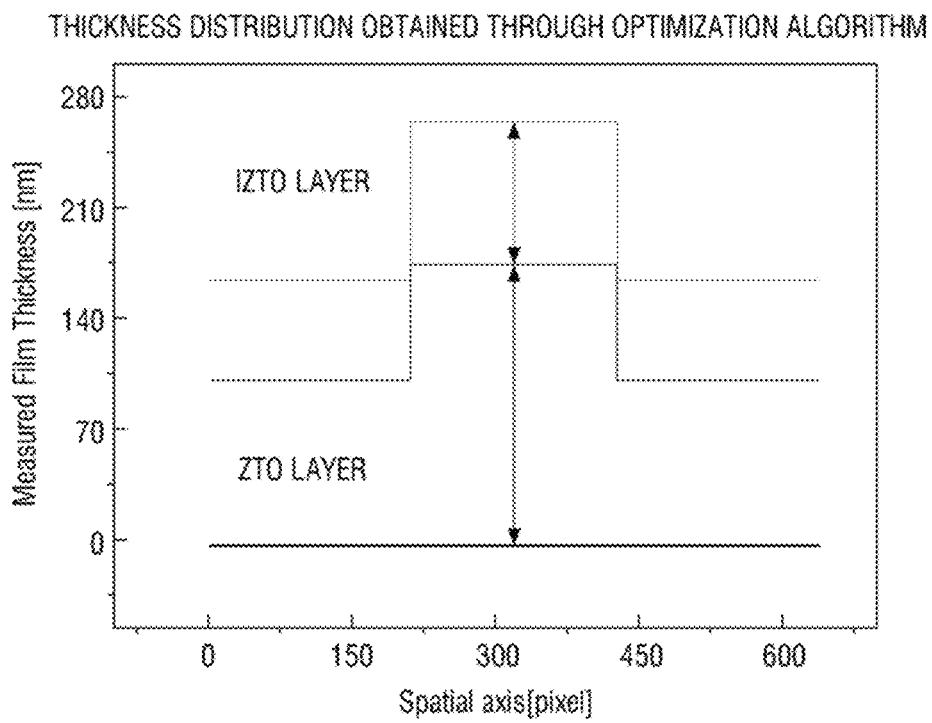
FIG. 35 is a graph of a thickness distribution obtained by an optimization algorithm.
Figure 36:
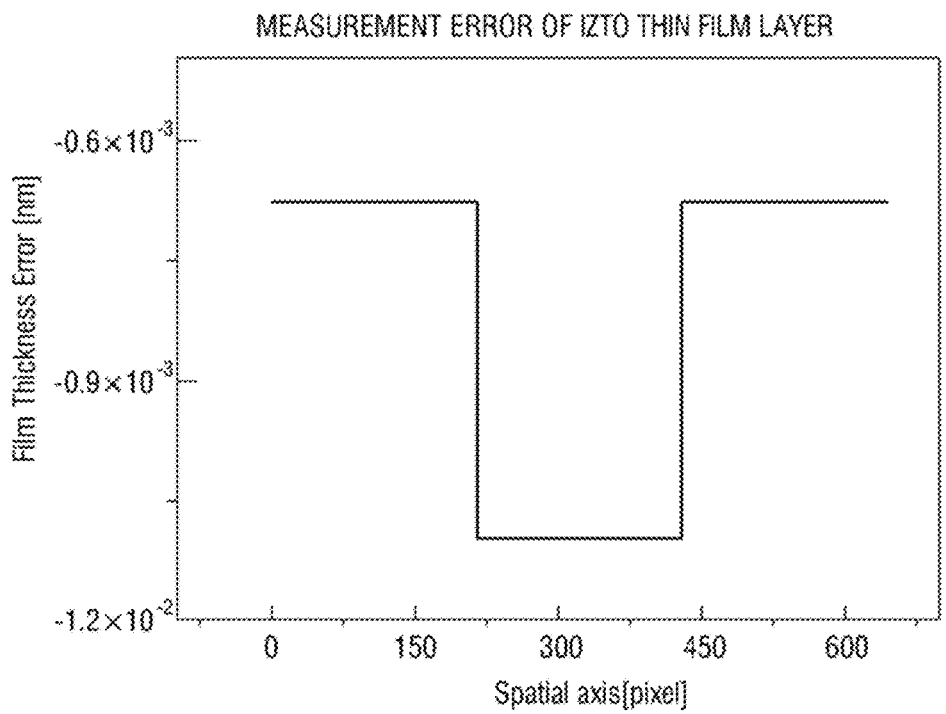
FIG. 36 is a measurement error of an IZTO thin film layer.
Figure 37:
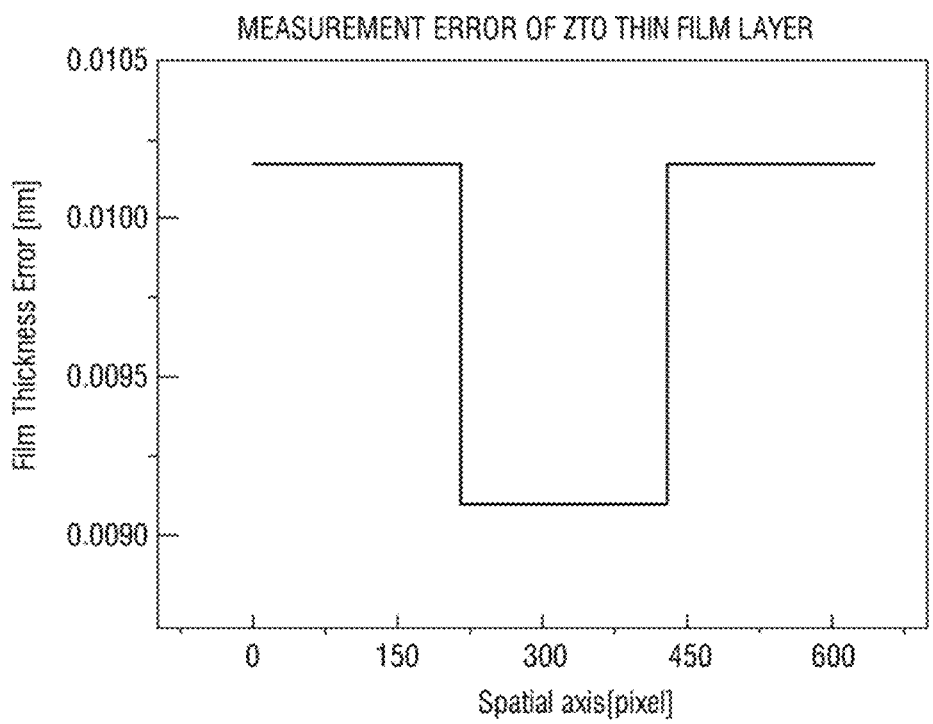
FIG. 37 is a graph of a measurement error of a ZTO thin film layer.

Next, the non-linear phase by the thin film thickness is extracted and the thin film thickness value through the reflectance is calculated by the simulation experiment. FIG. 34 illustrates a graph of a non-linear phase and reflectance by a thickness of a thin film, FIG. 35 illustrates a graph of a thickness distribution obtained by an optimization algorithm, FIG. 36 illustrates a measurement error of an IZTO thin film layer, and FIG. 37 illustrates a graph of a measurement error of a ZTO thin film layer. As illustrated in FIGS. 34 to 37, as the measurement result, it is understood that a very small error value of approximately 0.0105 nm or less is obtained.

Figure 38:
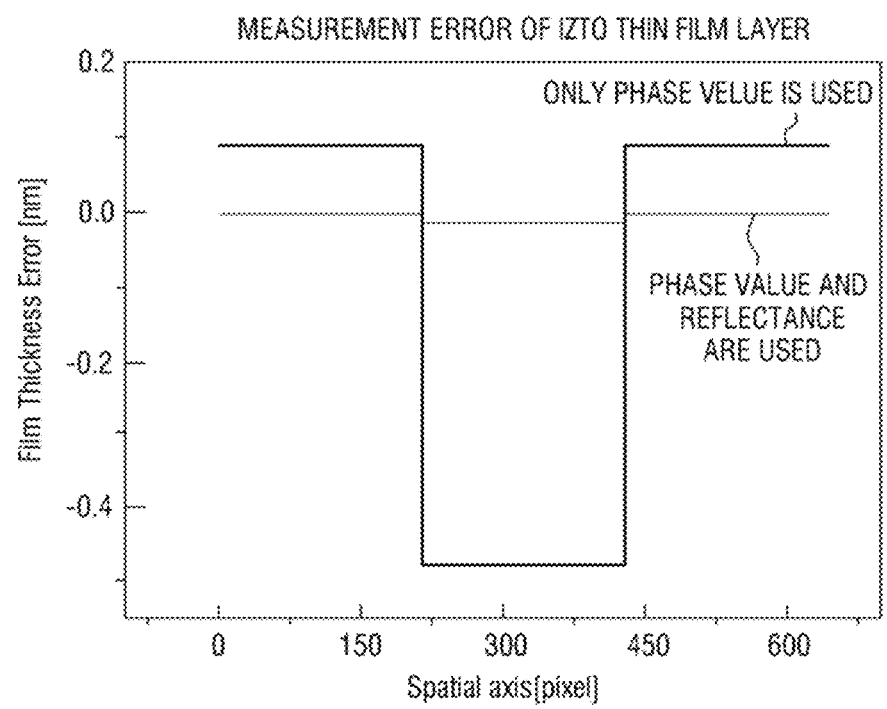
FIG. 38 is a graph of a measurement error of an IZTO thin film layer when only a phase value is used to measure the thin film thickness and when both the phase value and the reflectance are applied.
Figure 39:
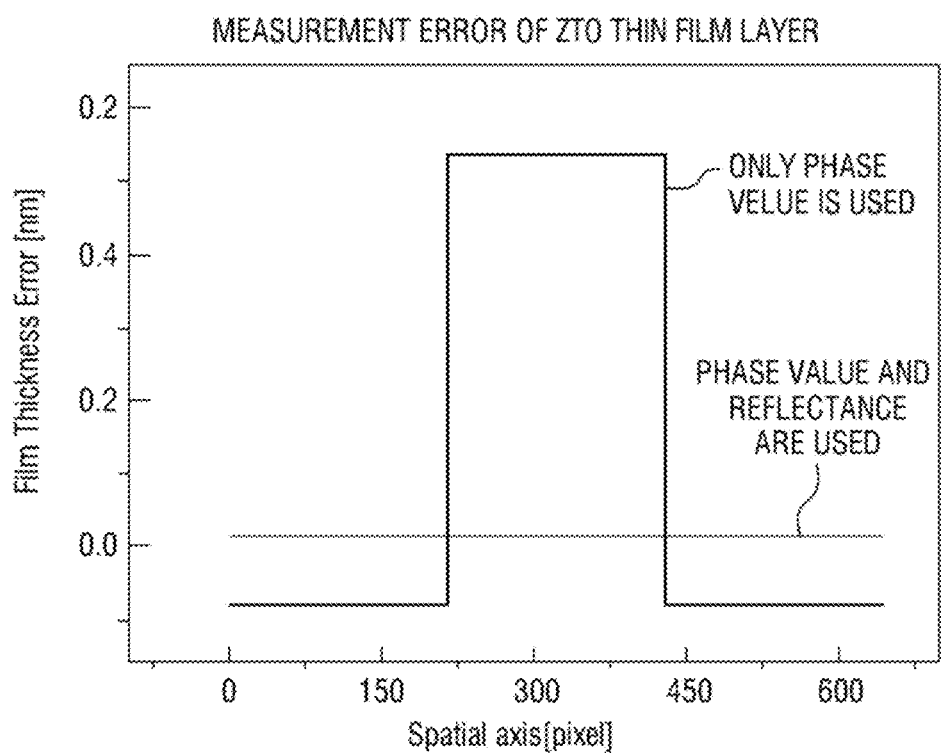
FIG. 39 is a graph of a measurement error of an IZTO thin film layer when only a phase value is used to measure the thin film thickness and when both the phase value and the reflectance are applied.

FIG. 38 illustrates a graph of a measurement error of an IZTO thin film layer when only a phase value is used to measure the thickness of the thin film and when both the phase value and the reflectance are applied and FIG. 39 illustrates a graph of a measurement error of an IZTO thin film layer when only a phase value is used to measure the thickness of the thin film and when both the phase value and the reflectance are applied.

That is, it is understood that when the optimization is performed using Equation 1 suggested in the present disclosure simultaneously using the phase value and the reflectance value, a measurement precision is improved by 100 times or more as compared with the case when the thickness of the multilayered thin film is measured using only the phase value.

The present disclosure can be implemented as a computer-readable code in a computer-readable recording medium. The computer readable recording medium includes all types of recording devices in which data readable by a computer system is stored. Examples of the computer readable recording medium are ROM, RAM, CD-ROM, a magnetic tape, a floppy disk, an optical data storing device and also implemented as a carrier wave (for example, transmission through the Internet). The computer readable recording medium is distributed in computer systems connected through a network and a computer readable code is stored therein and executed in a distributed manner. Further, a functional program, a code, and a code segment which may implement the present disclosure may be easily deducted by the programmers in the art.

In the apparatus and the method thereof described above, the configuration and method of embodiments as described above may not be applied with limitation, but the embodiments may be configured by selectively combining all or a part of each embodiment such that various modifications may be made.

INDUSTRIAL APPLICABILITY

The present disclosure relates to an apparatus for measuring a thickness and a surface profile of a multilayered film structure using an imaging spectral optical system and a measuring method.

The invention claimed is:
1. A method for measuring a thickness and a surface profile of a multilayered film structure using an imaging spectral optical system to obtain thickness information and surface profile information of an object to be measured coated with a thin film, the method comprising:
  a first step of splitting light emitted from a light source into two light paths by a beam splitter;
  a second step of causing one of the two light paths in the first step to be incident onto an object to be measured covered with a thin film and then allowing an imaging spectrometer to obtain first reflected light obtained by light reflected from an upper layer and a lower layer of the thin film and interfered with each other;
  a third step of obtaining second light by causing the remaining light of the two light paths split in the first step to be incident onto a reference mirror and then reflecting the remaining light;
  a fourth step of obtaining interference light in which the first reflected light and the second reflected light are combined by the imaging spectrometer;
  a fifth step of calculating an absolute reflectance value by obtaining an interference fringe of the first reflected light;
  a sixth step of extracting a phase component value having thickness information and surface profile information from the interference fringe of the interference light;
  a seventh step of calculating thin film thickness information from the absolute reflectance value and the phase component value; and
  an eighth step of calculating thin film surface profile information from the thin film thickness information measured in the seventh step and the phase component value.

2. The method of claim 1, wherein an interferometer module includes a blocking plate which is provided between the beam splitter and the reference mirror to selectively absorb light which is incident onto the reference mirror and in the second step, in a reflected light measuring mode, the blocking plate absorbs the light which is incident onto the reference mirror.

3. The method of claim 2, wherein in an interference mode, the blocking plate performs the second to fourth steps without blocking the light which is incident onto the reference mirror.

4. The method of claim 3, wherein the phase component value for calculating the thin film thickness information is a non-linear component among the phase component values extracted in the sixth step.

5. The method of claim 4, wherein the thin film thickness information measured in the seventh step is measured by the following Equation 1:

$$\zeta(d) = \sum_{i=1}^{n} \left[ \eta |R^E(k_i) - R^T(d; k_i)|^2 + \gamma |\Phi_{non\text{-}linear}^E(k_i) - \Phi_{non\text{-}linear}^T(d; k_i)|^2 \right] \quad \text{[Equation 1]}$$

in Equation 1, $R^E(k_i)$ is an absolute reflectance value for every wavenumber obtained by the imaging spectrometer and $R^T(d_j k_i)$ is a theoretical absolute reflectance value for every wavenumber by the thin film thickness, $\Phi_{non\text{-}linear}^E(k_i)$ is a non-linear phase component value for every wavenumber obtained by the imaging spectrometer and $\Phi_{non\text{-}linear}^E(k_i)$ is a theoretical phase component value for every wavenumber by the thin film thickness, and η is a weight by the absolute reflectance value and γ is a weight by the non-linear phase component value, ζ(d) is the Reiman zeta function of the thin film thickness d, n is an integer, $k_i$ is a wavenumber, $d_j$ is a thin film thickness, i is an integer index, and $_j$ is an integer index.

6. The method of claim 5, wherein the thin film surface profile information measured in the eighth step is measured using the thin film thickness information obtained by Equation 1, by the following Equation 2:

$$\Phi(h, d_j k_i) = 2k_i h + \Psi(d_j k_i) \quad \text{[Equation 2]}$$

$$h = \frac{\Phi(h, d_j k_i) - \Psi(d_j k_i)}{2k_i}$$

in Equation 2, $\Phi(h,d_j k_i)$ is all the measured phase component values and $\Psi(d; k_i)$ is a theoretical phase component value by the thin film thickness, and h is the profile information.

7. The method of claim 5, wherein the thin film surface profile information measured in the eighth step is measured using the thin film thickness information obtained by Equation 1, by the following Equation 3:

$$\xi(h) = \sum_{i=1}^{n} \left| \frac{\Phi^E(k_i) - \Psi^T(d_j k_i)}{2k_i} - h \right|^2 \quad \text{[Equation 3]}$$

in Equation 3, $\Phi^E(k_i)$ is all measured phase component values and $\Psi^T(d; k_i)$ is a theoretical phase component value which is mathematically calculated in advance using the thickness information d of the thin film obtained from Equation 1, and h is surface profile information.

8. The method of claim 7, wherein a piezoelectric actuator which changes a distance between the interferometer module and the object to be measured is included and the interference mode is performed while shifting the phase by a distance set as much as the number set by the piezoelectric actuator.

9. The method of claim 8, wherein an interference signal of the interference light is measured at every phase shift and the phase component value is extracted through the phase shift algorithm.

10. A non-transitory computer readable recording medium which allows a computer to execute the measuring method of claim 1.

11. An apparatus for measuring a thickness and a surface profile of a multilayered film structure using an imaging spectral optical system to obtain thickness information and surface profile information of an object to be measured coated with a thin film, the apparatus comprising:
   an illumination optical module having a light source which emits light;
   an interferometer module having a beam splitter which splits light emitted from the illumination optical module, a reference mirror which emits second reflected light by causing some light split by the beam splitter to be incident thereon and then reflecting the light, and a blocking plate which selectively blocks the some light which is incident onto the reference mirror;
   a piezoelectric actuator which changes a distance between the interferometer module and the object to be measured configured by a multilayered thin film;
   a plate driver which drives the blocking plate to selectively block the some light which is incident onto the reference mirror; and
   an imaging spectrometer module which causes the remaining light of the split light to be incident onto an object to be measured covered with a thin film and then obtains first reflected light obtained by light reflected from an upper layer and a lower layer of the thin film being interfered with each other and obtains interference light obtained by combining the first reflected light and the second reflected light to calculate an absolute reflectance value from an interference fringe of the first reflected light and extract a phase component value having thickness information and surface profile information from the interference fringe of the interference light, measure thin film thickness information from the absolute reflectance value and the phase component value, and measure thin film surface profile information from the measured thin film thickness information and the phase component value.

12. The apparatus of claim 11, wherein the imaging spectrometer module measures the thin film thickness information from the absolute reflectance value and a non-linear phase component value extracted from the phase component value.

13. The apparatus of claim 12, wherein in a reflected light measuring mode, the plate driver drives the blocking plate to block light which is incident onto the reference mirror and in an interference mode, the plate driver drives the blocking plate so as not to block the light which is incident onto the reference mirror.

14. The apparatus of claim 13, wherein the interference mode is performed while shifting the phase by a distance set as much as the number set by the piezoelectric actuator.

15. The apparatus of claim 14, wherein an interference signal of the interference light is measured at every phase shift and the phase component value is extracted through the phase shift algorithm.

\* \* \* \* \*